US008543394B2

(12) United States Patent
Shin

(10) Patent No.: US 8,543,394 B2
(45) Date of Patent: Sep. 24, 2013

(54) MOBILE TERMINAL AND TEXT CORRECTING METHOD IN THE SAME

(75) Inventor: Jong-Ho Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 1288 days.

(21) Appl. No.: 12/355,068

(22) Filed: Jan. 16, 2009

(65) Prior Publication Data
US 2009/0306980 A1    Dec. 10, 2009

(30) Foreign Application Priority Data

Jun. 9, 2008 (KR) .......................... 10-2008-0053713

(51) Int. Cl.
*G10L 15/00* (2013.01)
*G10L 15/26* (2006.01)
(52) U.S. Cl.
USPC ............ 704/235; 704/231; 704/251; 704/270
(58) Field of Classification Search
USPC ......................................... 704/231, 235, 275
See application file for complete search history.

(56) References Cited

U.S. PATENT DOCUMENTS

| | | | | |
|---|---|---|---|---|
| 4,582,441 A | * | 4/1986 | Carter et al. ................. | 400/712 |
| 5,855,000 A | | 12/1998 | Waibel et al. | |
| 5,909,667 A | * | 6/1999 | Leontiades et al. ........... | 704/275 |
| 6,611,802 B2 | * | 8/2003 | Lewis et al. .................. | 704/235 |
| 6,993,482 B2 | * | 1/2006 | Ahlenius ...................... | 704/235 |
| 2005/0049868 A1 | * | 3/2005 | Busayapongchai ........... | 704/251 |
| 2005/0159950 A1 | | 7/2005 | Roth et al. | |

FOREIGN PATENT DOCUMENTS

| | | |
|---|---|---|
| EP | 0 841 655 A2 | 5/1998 |
| KR | 10-2004-0008546 A | 1/2004 |
| KR | 10-2006-0058006 A | 5/2006 |
| WO | WO 00/45376 A1 | 8/2000 |
| WO | WO 2006/016308 A1 | 2/2006 |

* cited by examiner

*Primary Examiner* — Talivaldis Ivars Smits
*Assistant Examiner* — Shaun Roberts
(74) *Attorney, Agent, or Firm* — Birch, Stewart, Kolasch & Birch, LLP

(57) ABSTRACT

A mobile terminal including a voice receiving unit configured to receive input voice, a controller configured to convert the received input voice to text, a display configured to display the converted text, and an input unit configured to select a word included in the displayed converted text. Further, the controller is further configured to control the display to display a plurality of possible candidate words corresponding to the selected word in an arrangement in which a corresponding displayed candidate word is displayed with a proximity from the selected word that is based on how similar the corresponding candidate word is to the selected word.

16 Claims, 24 Drawing Sheets

(a)

(b)

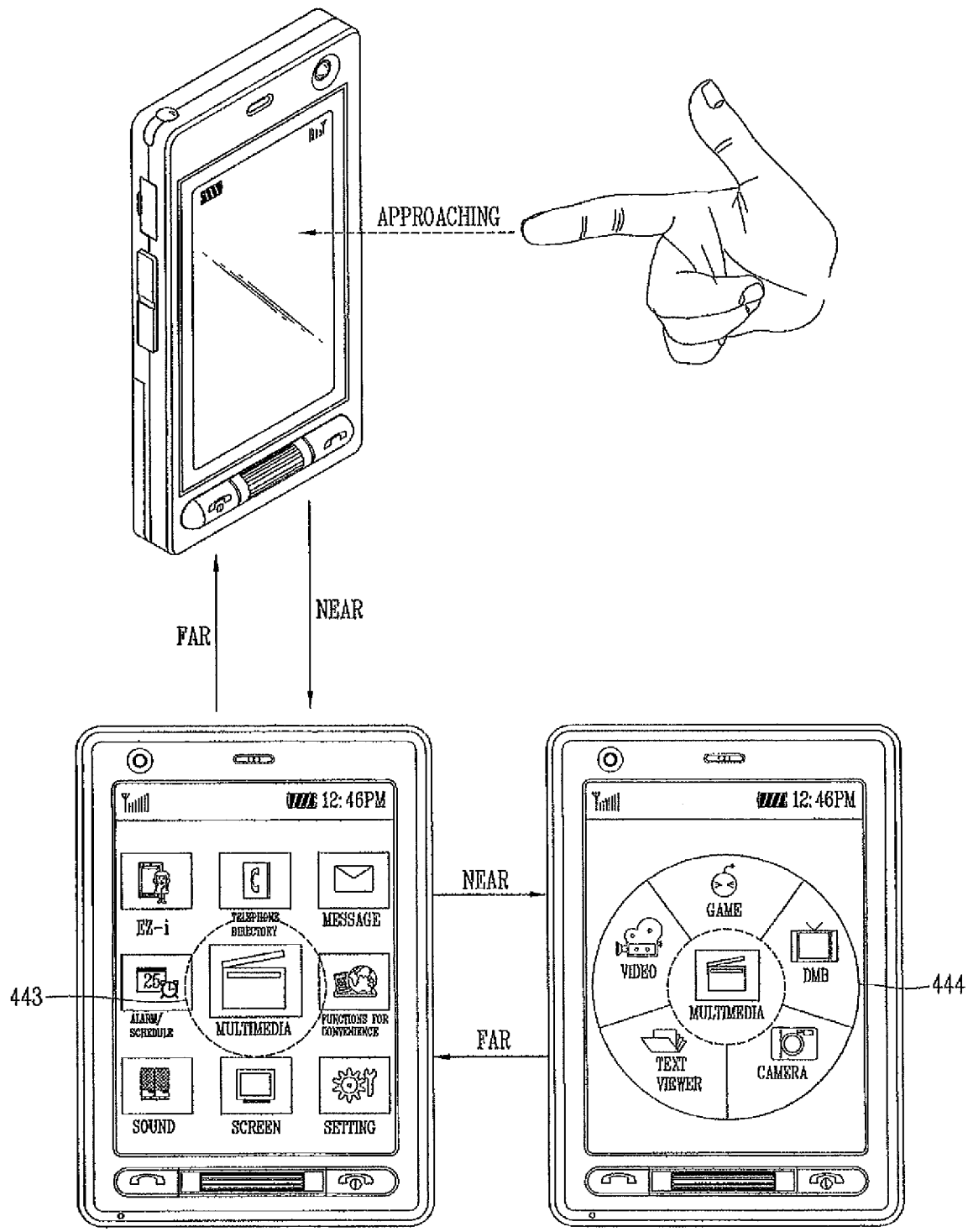

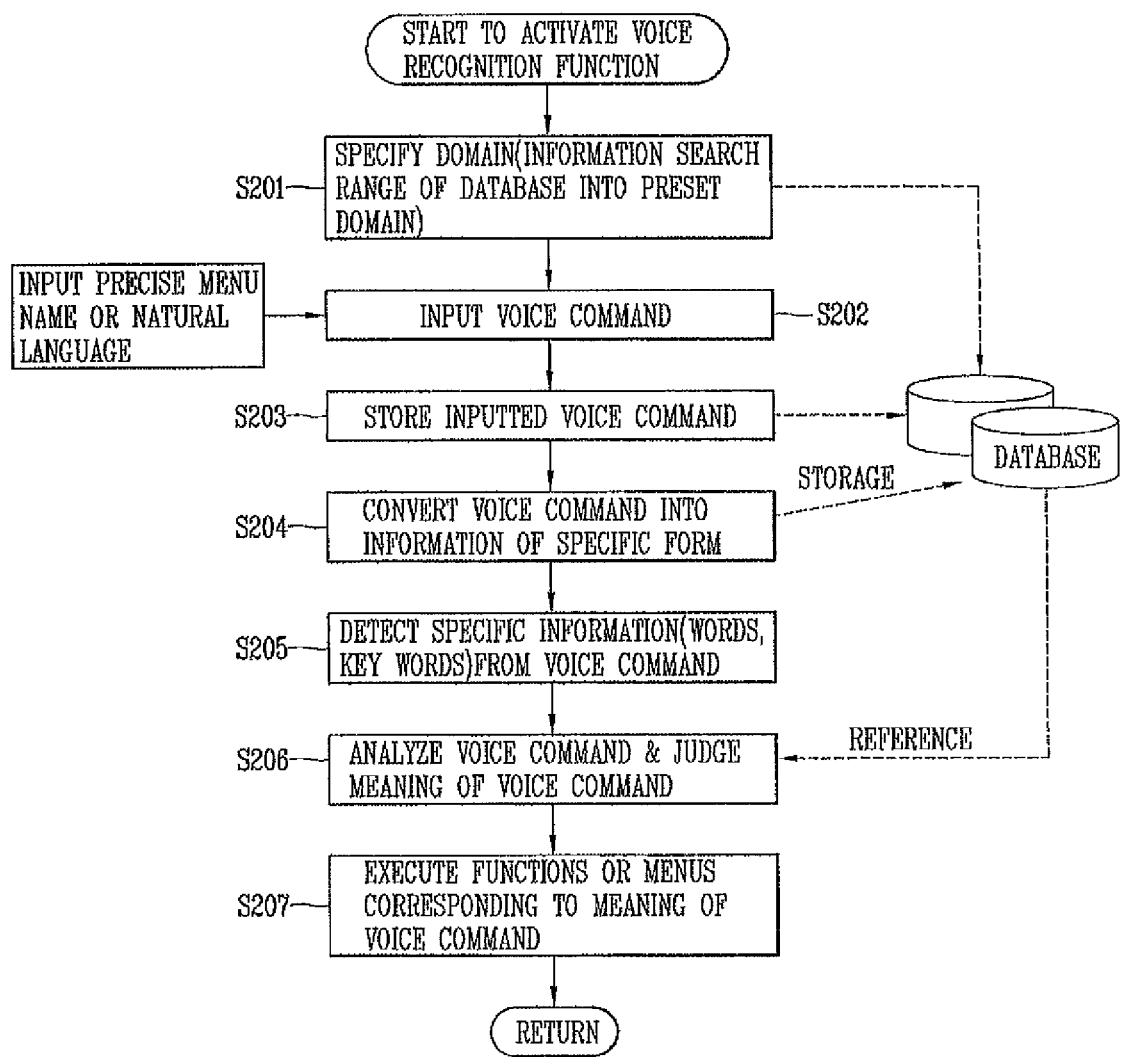

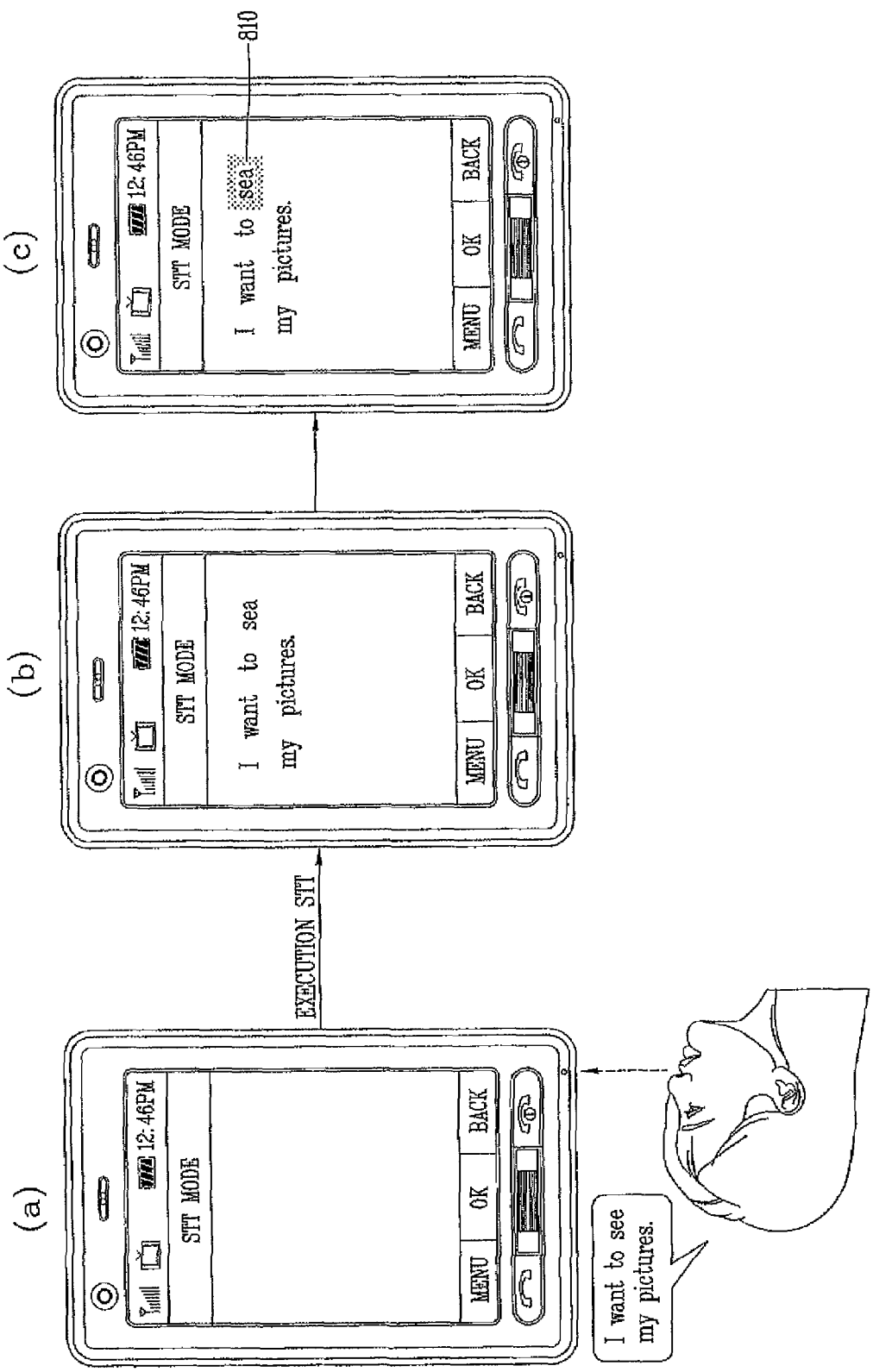

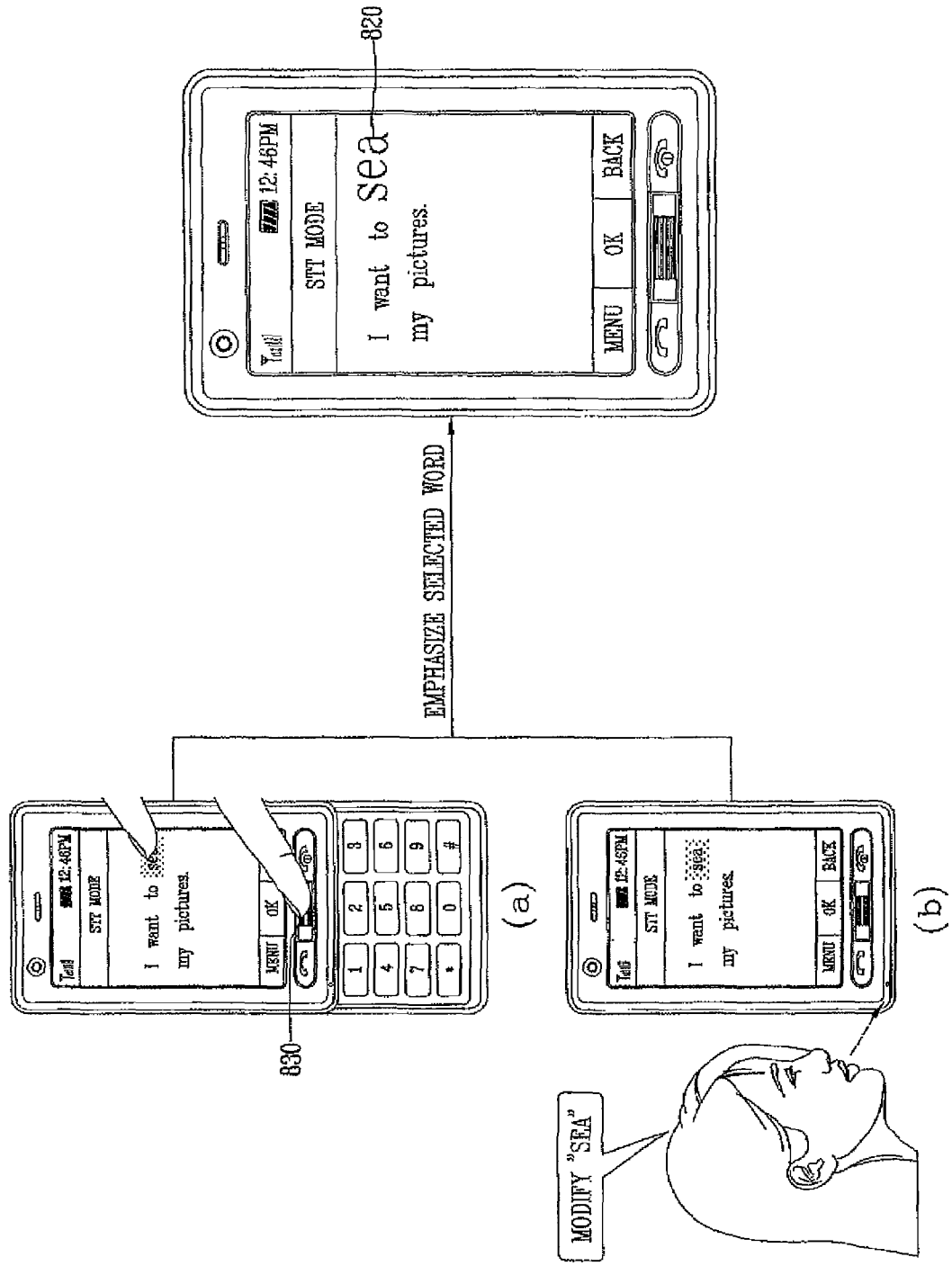

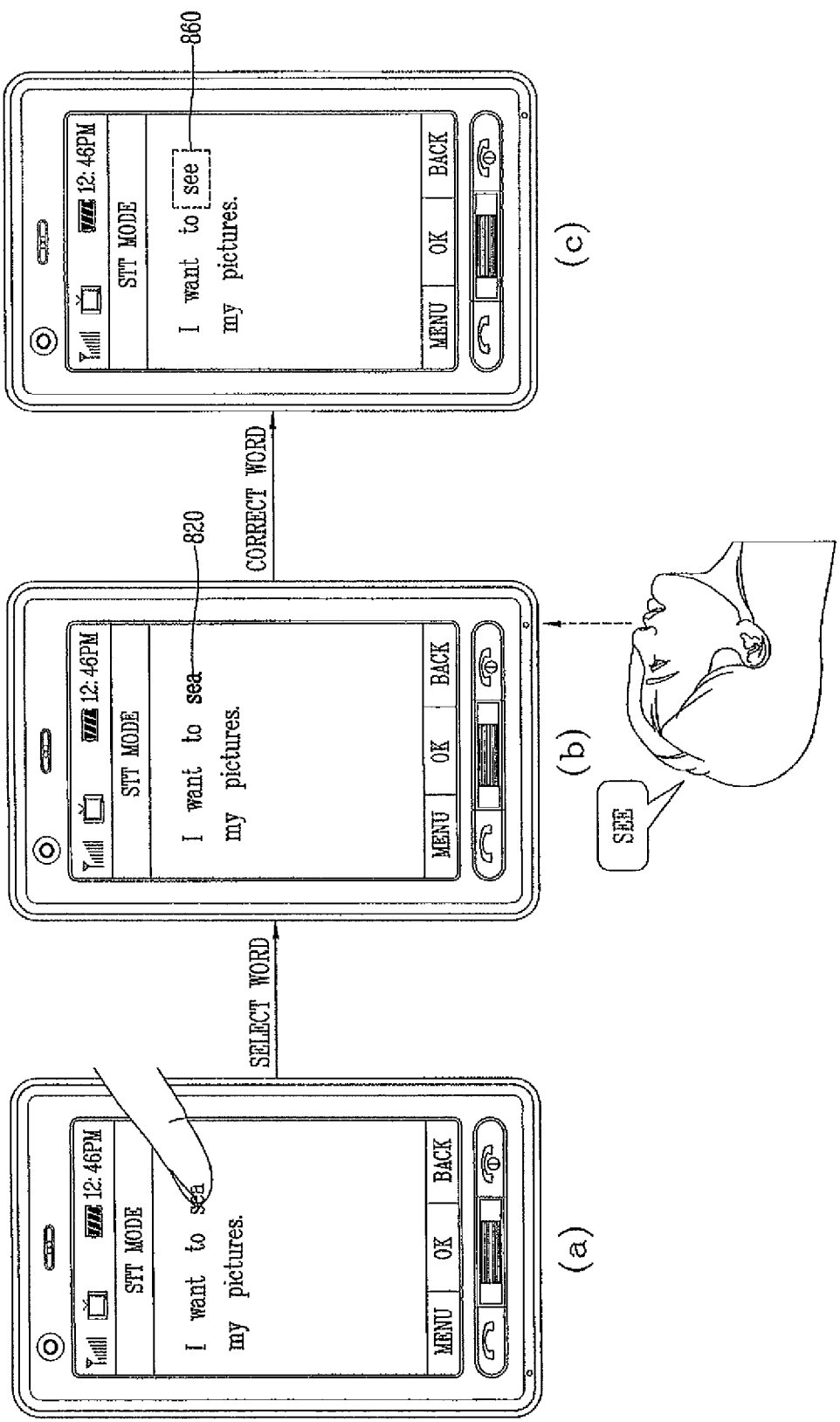

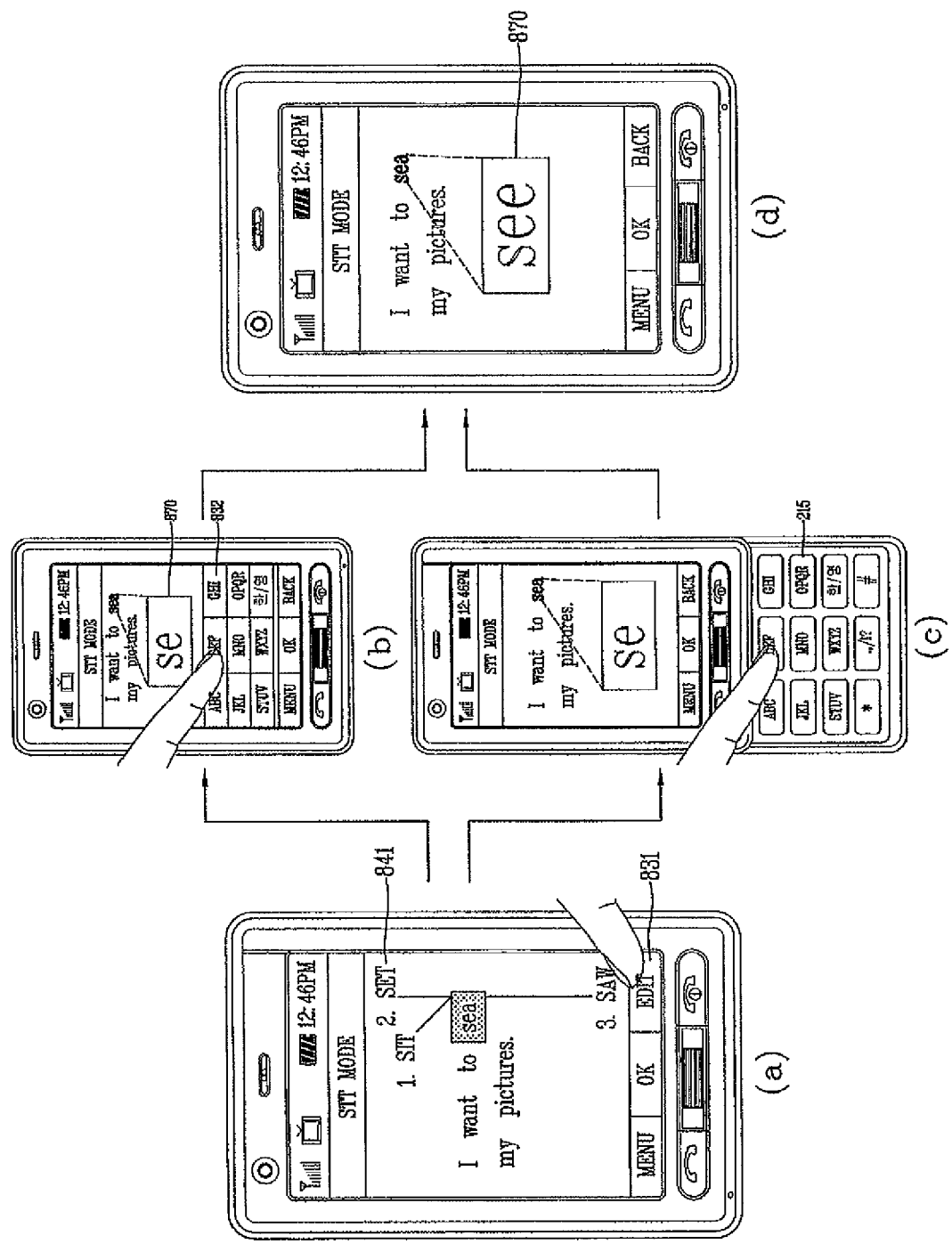

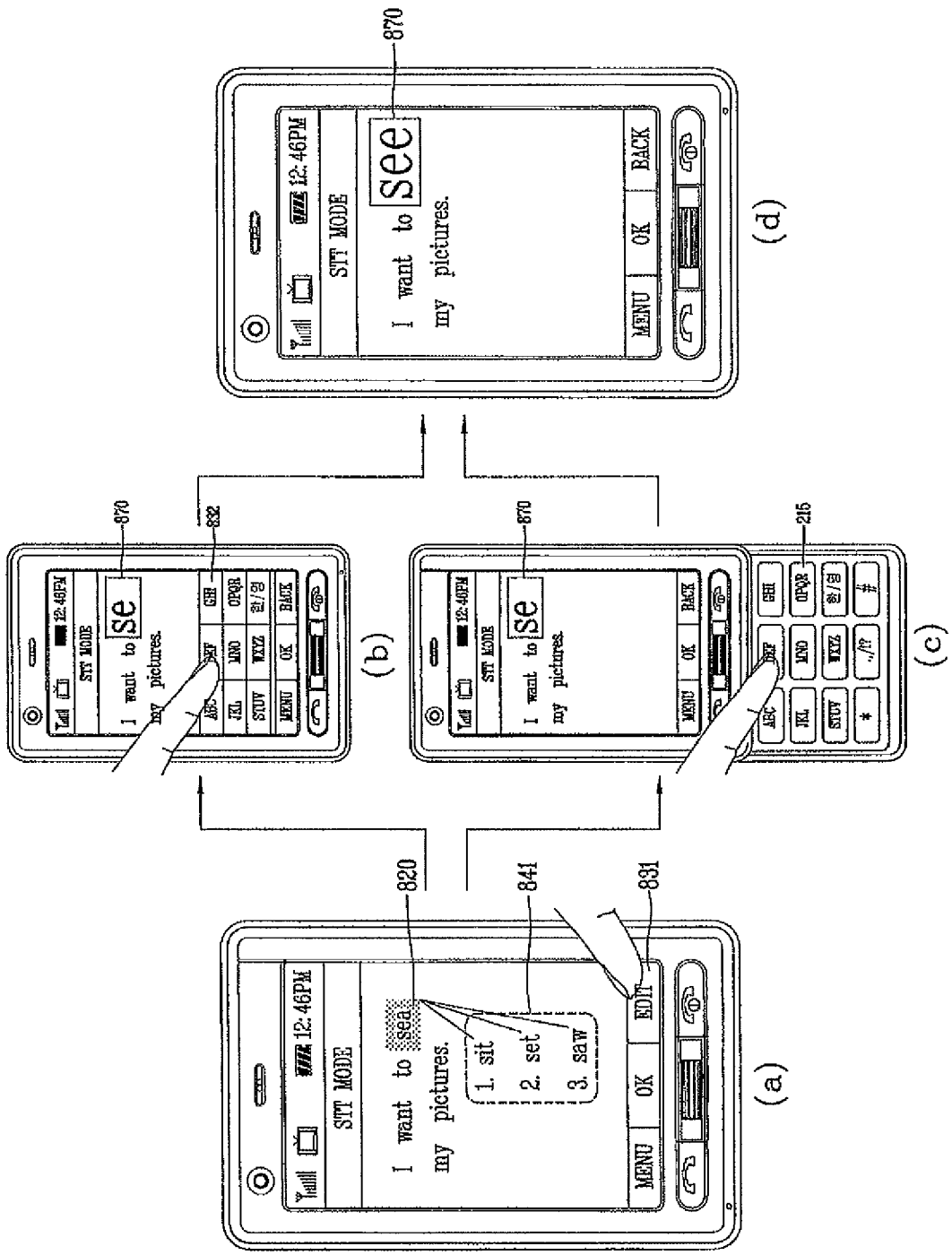

MOBILE TERMINAL AND TEXT CORRECTING METHOD IN THE SAME

CROSS-REFERENCE TO A RELATED APPLICATION

The present invention claims priority to Korean Application No. 10-2008-0053713, filed in Korea on Jun. 9, 2008, which is herein expressly incorporated by reference in its entirety.

BACKGROUND OF THE INVENTION

1. Field of the Invention

The present invention relates to a mobile terminal and corresponding method for allowing a user to easily edit or change voice-converted text displayed on the terminal.

2. Background of the Invention

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Some mobile terminals also include voice recognition techniques that allow the user to enter voice commands to the terminal such as "call home." The terminal then calls a number corresponding to a home phonebook item stored in the memory of the terminal. However, the background voice recognition techniques are limited and often do not correctly interpret the voice instruction input by the user.

SUMMARY OF THE INVENTION

Accordingly, one object of the present invention is to address the above-noted and other drawbacks.

Another object of the present invention is to provide a mobile terminal and corresponding method for allowing a user to easily edit and change voice-converted text displayed on the terminal.

Yet another object of the present invention is to provide a mobile terminal and corresponding method for displaying candidate words having a similar pronunciation to a selected or misinterpreted word.

Still another object of the present invention is to provide a mobile terminal and corresponding method for displaying a plurality of possible candidate words corresponding to a selected word in an arrangement in which a corresponding displayed candidate word is displayed with a proximity from the selected word that is based on how similar the corresponding candidate word is to the selected word.

To achieve these and other advantages and in accordance with the purpose of the present invention, as embodied and broadly described herein, the present invention provides in one aspect a mobile terminal including a voice receiving unit configured to receive input voice, a controller configured to convert the received input voice to text, a display configured to display the converted text, and an input unit configured to select a word included in the displayed converted text. Further, the controller is further configured to control the display to display a plurality of possible candidate words corresponding to the selected word in an arrangement in which a corresponding displayed candidate word is displayed with a proximity from the selected word that is based on how similar the corresponding candidate word is to the selected word. The present invention also provides a corresponding method of controlling a mobile terminal.

In another aspect, the present invention provides a mobile terminal including a voice receiving unit configured to receive input voice, a controller configured to convert the received input voice to text, a display configured to display the converted text, and an input unit configured to select a word included in the displayed converted text. Further, the controller is further configured to control the voice receiving unit to receive a new input voice instruction requesting an editing operation of the selected word, and to control the display to display an edit window for editing the selected word based on the received new input voice instruction. The present invention also provides a corresponding method of controlling a mobile terminal.

The foregoing and other objects, features, aspects and advantages of the present invention will become more apparent from the following detailed description of the present invention when taken in conjunction with the accompanying drawings. Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6B and 6C include overviews of display screens illustrating a method for outputting help information in a mobile terminal according to an embodiment of the present invention;

FIG. 7A is a flowchart illustrating a method for recognizing a voice command in a mobile terminal according to an embodiment of the present invention;

FIGS. 12A and 12B include overviews of display screens illustrating a method for selecting an arbitrary word so as to correct a text displayed on a screen of a mobile terminal according to an embodiment of the present invention;

FIGS. 14A and 14B include overviews of display screens illustrating a method for changing text displayed on a screen of a mobile terminal to a candidate word selected from a candidate word list according to an embodiment of the present invention;

FIGS. 16A and 16B include overviews of display screens illustrating a method for editing a specific word displayed on a mobile terminal according to an embodiment of the present invention; and FIGS. 17A and 17B include overviews of display screens illustrating a method for editing a specific word displayed on a mobile terminal according to another embodiment of the present invention.

DETAILED DESCRIPTION OF THE INVENTION

Reference will now be made in detail to the preferred embodiments of the present invention, examples of which are illustrated in the accompanying drawings.

Figure 1:
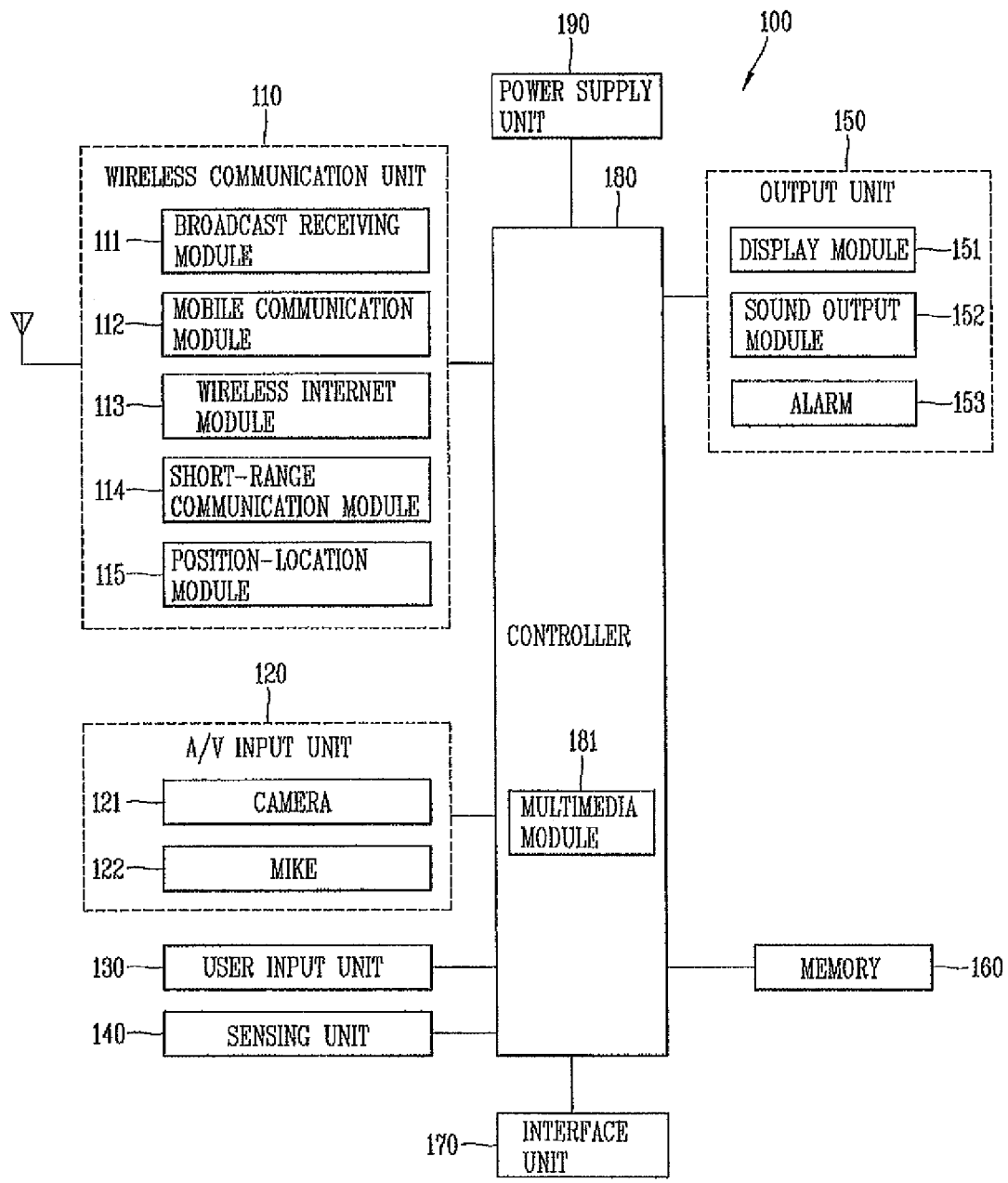
FIG. 1 is a block diagram showing a mobile terminal according to one embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and electronic service guide (ESG) of the digital video broadcast-handhold (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Figure 2:
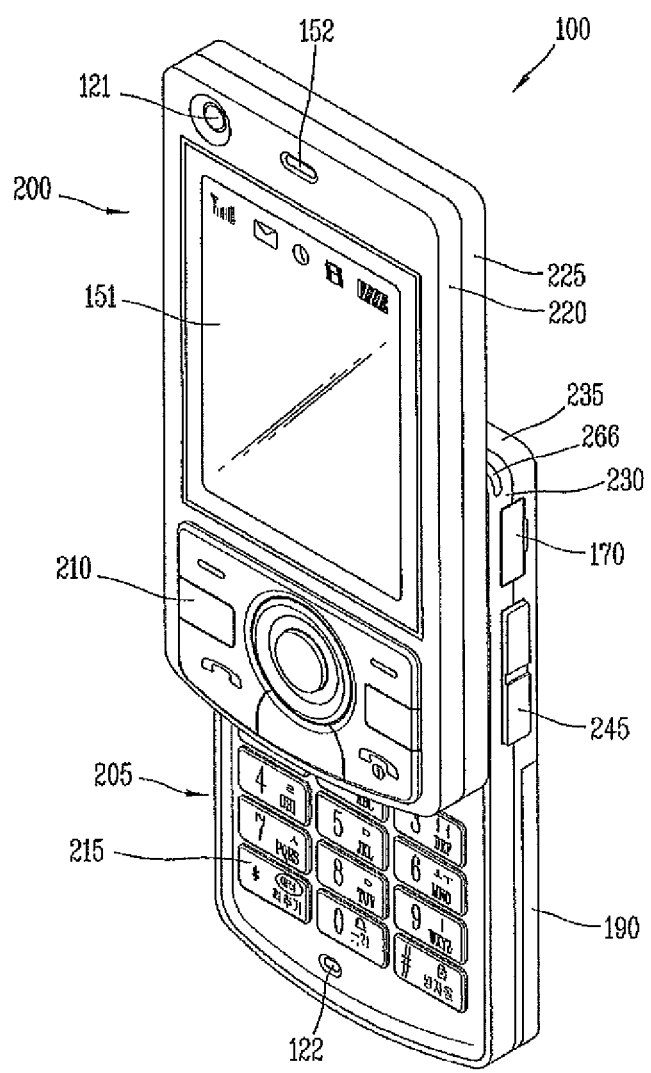
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are generally sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
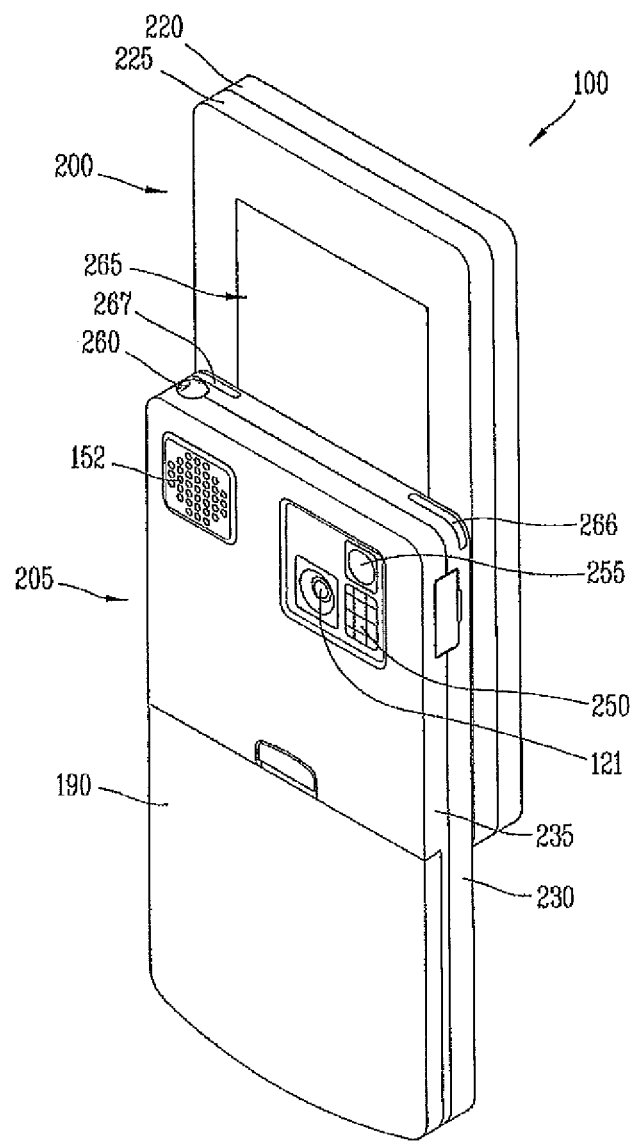
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). The antenna 260 may also be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. For example, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
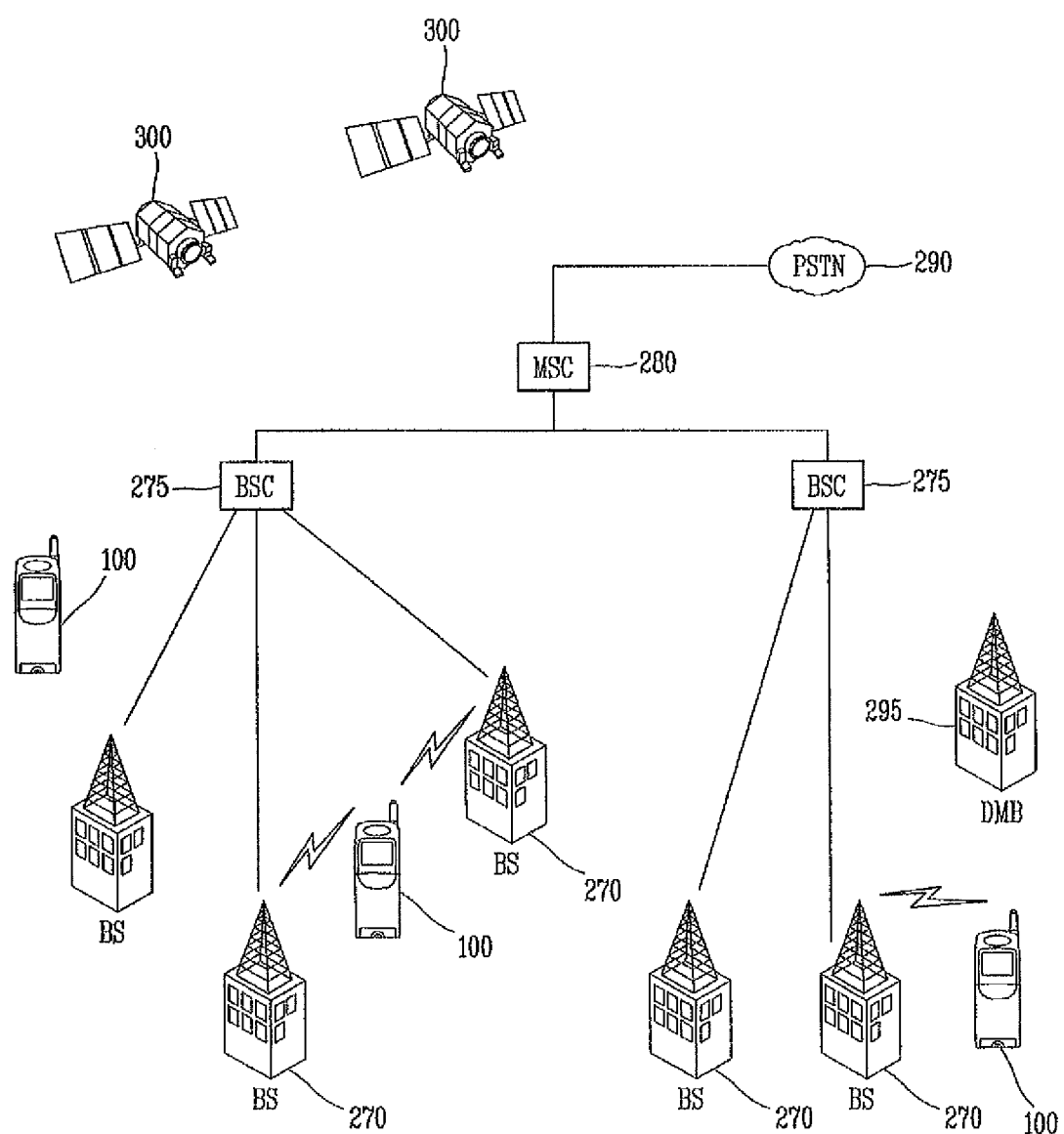
FIG. 4 is an overview of a communication system operable with a mobile terminal according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or XDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during operation of the wireless communication system, the base stations 270 receive sets of reverse-link signals from various mobile terminals 100. The mobile terminals 100 also engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

The mobile terminal according to the present invention is configured such that an algorithm for a voice recognition and an algorithm for Speech To Text (STT) are stored in the memory 160. Further, the voice recognition function and the STT function cooperate together so as to convert a user's voice into a text format. The converted text can also be output on an execution screen of the terminal. Thus, the user can perform functions such as generating text for text messages or mails, etc. by speaking into the terminal. The controller 180 can also activate the voice recognition function and automatically drive the STT function.

Figure 5:
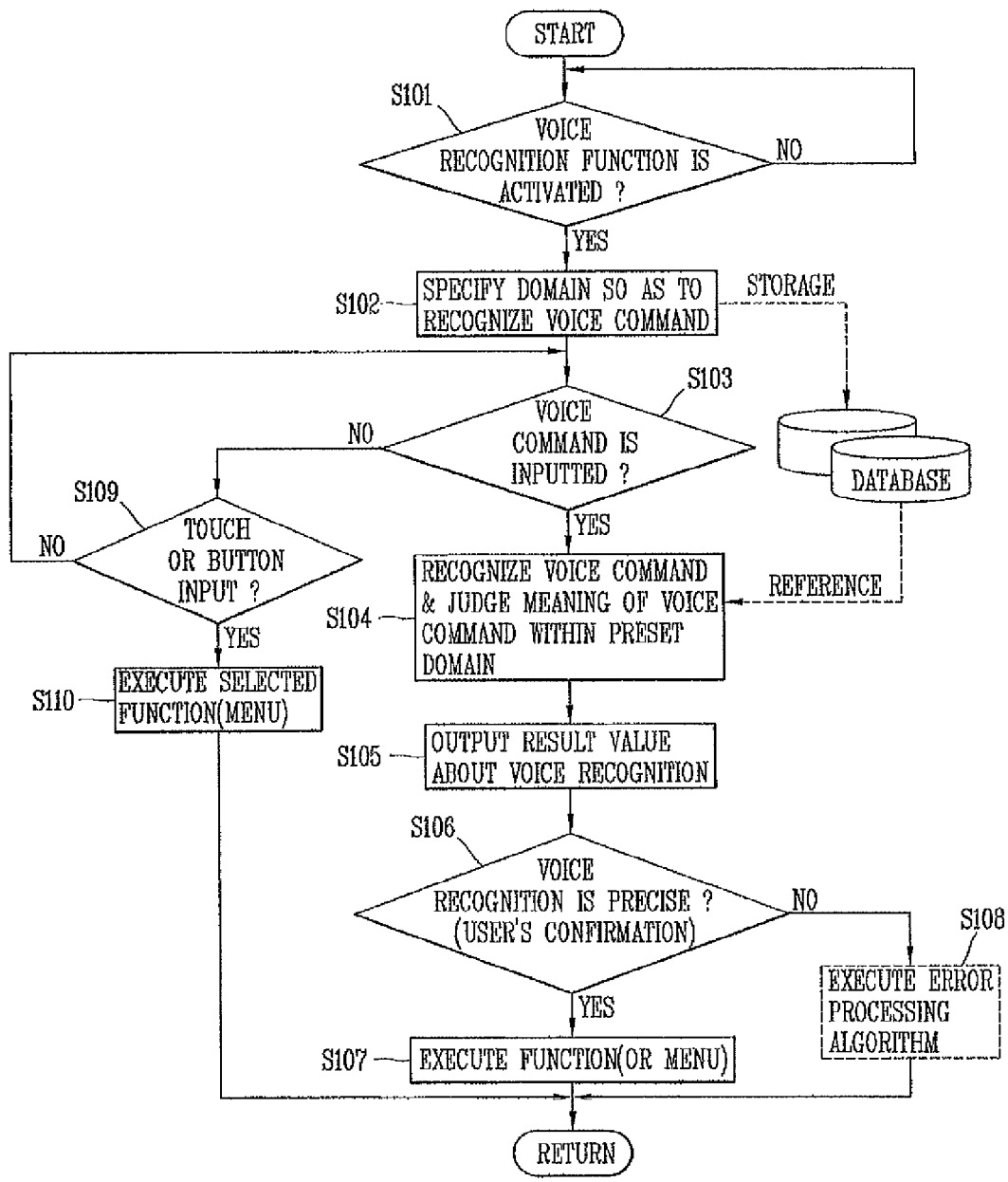
FIG. 5 is a flowchart illustrating a menu voice control method in a mobile terminal according to an embodiment of the present invention.

Next, FIG. 5 is a flowchart illustrating a menu voice control method for a mobile terminal according to an embodiment of the present invention. As shown in FIG. 5, the controller 180 determines if the voice recognition function has been activated (S101). Further, the voice recognition function may be activated by the user selecting hardware buttons on the mobile terminal, or soft touch buttons displayed on the display 151. The user may also activate the voice recognition function by manipulating specific menus displayed on the display 151, by generating a specific sound or sound effects, by short or long-range wireless signals, or by the user's body information such as hand gesture or body gesture.

In more detail, the specific sound or sound effects may include impact sounds having a level more than a specific level. Further, the specific sound or sound effects may simply be detected using a sound level detecting algorithm. In addition, the sound level detecting algorithm is preferably more simple than a voice recognition algorithm, and thus consumes less resources of the mobile terminal. Also, the sound level detecting algorithm (or circuit) may be individually implemented from the voice recognition algorithm or circuit, or may be implemented so as to specify some functions of the voice recognition algorithm.

In addition, the wireless signals may be received through the wireless communication unit 110, and the user's hand or body gestures may be received through the sensing unit 140. Thus, in an embodiment of the present invention, the wireless communication unit 110, the user input unit 130, and the sensing unit 140 may be referred to as a signal input unit. Further, the voice recognition function may also be terminated in a similar manner.

Having the user physically activate the voice recognition function is particularly advantageous, because the user is more aware they are about to use voice commands to control the terminal. That is, because the user has to first perform a physical manipulation of the terminal, he or she intuitively recognizes they are going to input a voice command or instruction into the terminal, and therefore speak more clearly or slowly to thereby activate a particular function. Thus, because the user speaks more clearly or more slowly, for example, the probability of accurately recognizing the voice instruction increases. That is, in an embodiment of the present invention, the activation of the voice recognition function is performed by a physical manipulation of a button on the terminal rather than activating the voice recognition function by speaking into the terminal.

Further, the controller 180 may start or terminate activation of the voice recognition function based on how many times the user touches a particular button or portion of the touch screen, how long the user touches a particular button or portion of the touch screen, etc. The user can also set how the controller 180 is to activate the voice recognition function using an appropriate menu option provided by the present invention. For example, the user can select a menu option on the terminal that includes 1) set activation of voice recognition based on X number of times the voice activation button is selected, 2) set activation of voice recognition based on X amount of time the voice activation button is selected, 3) set activation of voice recognition when the buttons X and Y are selected, etc. The user can then enter the values of X and Y in order to variably set how the controller 180 determines the voice activation function is activated. Thus, according to an embodiment of the present invention, the user is actively engaged with the voice activation function of their own mobile terminal, which increases the probability that the controller 180 will determine the correct function corresponding to the user's voice instruction, and which allows the user to tailor the voice activation function according to his or her needs.

The controller 180 may also maintain the activated state of the voice recognition function while the designated button(s) are touched or selected, and stop the voice recognition function when the designated button(s) are released. Alternatively, the controller 180 can maintain the activation of the voice recognition function for a predetermined time period after the designated button(s) are touched or selected, and stop or terminate the voice recognition function when the predetermined time period ends. In yet another embodiment, the controller 180 can store received voice instructions in the memory 160 while the voice recognition function is maintained in the activated state.

In addition, as shown in FIG. 5, a domain of the database used as a reference for recognizing the meaning of the voice command is specified to information relating to specific functions or menus on the terminal (S102). For instance, the specified domain of database may be information relating to menus currently displayed on the display 151, or information relating to sub-menus of one of the displayed menus. Further, because the domain of database is specified, the recognition rate for the input voice command is improved. Examples of domains include an e-mail domain, a received calls domain, and multimedia domain, etc.

Also, the information relating to sub-menus may be configured as data in a database. For example, the information may be configured in the form of a keyword, and a plurality of information may correspond to one function or menu. In addition, the database can be a plurality of databases according to features of information, and may be stored in the memory 160.

Further, the information in the database(s) may be advantageously updated or renewed through a learning process. Each domain of the respective databases may also be specified into a domain relating to functions or menus being currently output, so as to enhance a recognition rate for a voice command. The domain may also change as menu steps continue to progress.

Once the voice recognition function is activated (Yes in S101) and the domain has been specified (S102), the controller 180 determines if the user has input a voice command (S103). When the controller 180 determines the user has input the voice command (Yes in S103), the controller 180 analyzes a context and content of a voice command or instruction input through the microphone 122 based on a specific database, thereby judging a meaning of the voice command (S104).

Further, the controller 180 can determine the meaning of the voice instruction or command based on a language model and an acoustic model of the accessed domain. In more detail, the language model relates to the words themselves and the acoustic model corresponds to the way the words are spoken (e.g., frequency components of the spoken words or phrases). Using the language and acoustic models together with a specific domain and a state of the mobile terminal 100, the controller 180 can effectively determine the meaning of the input voice instructions or command.

Further, the controller 180 may immediately start the process for judging the meaning of the input voice command when the user releases the activation of the voice recognition function when the controller 180 stores the input voice command in the memory 160, or may simultaneously perform the voice activation function when the voice command is input.

In addition, if the voice command has not been fully input (No in S103), the controller 180 can still perform other functions. For example, if the user performs another action by touching a menu option, etc. or presses a button on the terminal (Yes in S109), the controller 180 performs the corresponding selected function (S110).

Further, after the controller 180 determines the meaning of the input voice command in step S104, the controller 180 outputs a result value of the meaning (S105). That is, the result value may include control signals for executing menus relating to functions or services corresponding to the determined meaning, for controlling specific components of the mobile terminal, etc. The result value may also include data for displaying information relating to the recognized voice command.

The controller 180 may also request the user confirm the output result value is accurate (S106). For instance, when the voice command has a low recognition rate or is determined to have a plurality of meanings, the controller 180 can output a plurality of menus relating to the respective meanings, and then execute a menu that is selected by the user (S107). Also, the controller 180 may ask a user whether to execute a specific menu having a high recognition rate, and then execute or display a corresponding function or menu according to the user's selection or response.

In addition, the controller 180 can also output a voice message asking the user to select a particular menu or option such as "Do you want to execute a message composing function? Reply with Yes or No." Then, the controller 180 executes or does not execute a function corresponding to the particular menu or option based on the user's response. If the user does not respond in a particular time period (e.g., five seconds), the controller 180 can also immediately execute the particular menu or option. That is, if there is no response from the user, the controller 180 may automatically execute the function or menu by judging the non-response as a positive answer.

That is, the error processing step may be performed (S108) by again receiving input of a voice command, or may be performed by displaying a plurality of menus having a recognition rate more than a certain level or a plurality of menus that may be judged to have similar meanings. The user can then select one of the plurality of menus. Also, when the number of functions or menus having a recognition rate more than a certain level is less than a preset number (e.g., two), the controller 180 can automatically execute the corresponding function or menu.

Figure 6A:
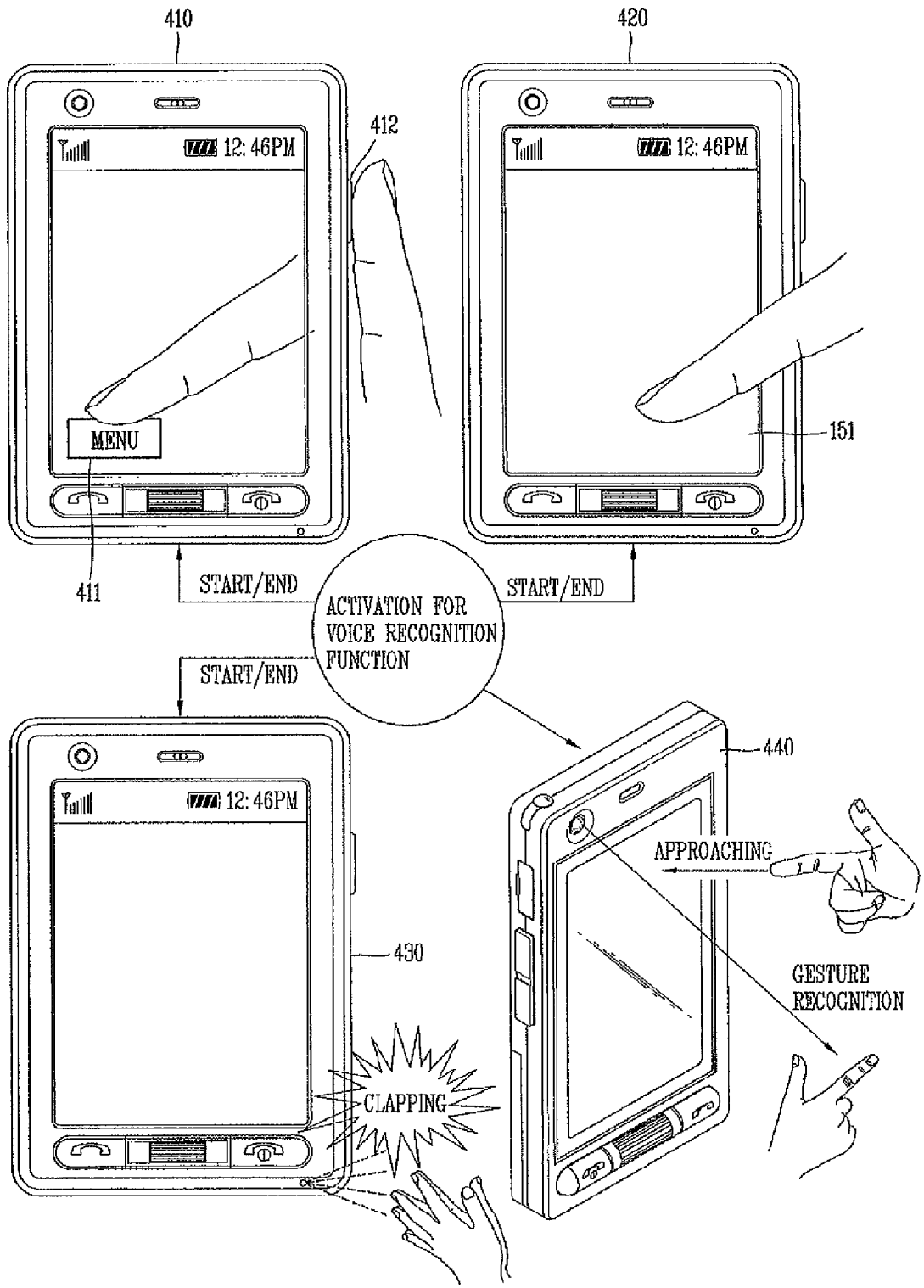
FIG. 6A include overviews of display screens illustrating a method for activating a voice recognition function in a mobile terminal according to an embodiment of the present invention.

Next, FIG. 6A is an overview showing a method for activating a voice recognition function for a mobile terminal according to an embodiment of the present invention. As shown in the display screen 410, the user can activate the voice recognition function by touching a soft button 411. The user can also terminate the voice recognition function by releasing the soft button 411. In more detail, the user can activate the voice recognition function by touching the soft button 411 and continuously touch the soft button 411, or hard button 412, until the voice instruction has been completed. That is, the user can release the soft button 411 or hard button 412 when the voice instruction has been completed. Thus, the controller 180 is made aware of when the voice instruction is to be input and when the voice instruction has been completed. As discussed above, because the user is directly involved in this determination, the accuracy of the interpretation of the input voice command is increased.

The controller 180 can also be configured to recognize the start of the voice activation feature when the user first touches the soft button 411, and then recognize the voice instruction has been completed when the user touches the soft button 411 twice, for example. Other selection methods are also possible. Further, as shown in the display screen 410 in FIG. 6A, rather than using the soft button 411, the voice activation and deactivation can be performed by manipulating the hard button 412 on the terminal.

In addition, the soft button 411 shown in the display screen 410 can be a single soft button that the user presses or releases to activate/deactivate the voice recognition function or may be a menu button that when selected produces a menu list such as "1. Start voice activation, and 2. Stop voice activation". The soft button 411 can also be displayed during a standby state, for example.

In another example, and as shown in the display screen 420, the user can also activate and deactivate the voice recognition function by touching an arbitrary position of the screen. The display screen 430 illustrates yet another example in which the user activates and deactivates the voice recognition function by producing a specific sound or sound effects that is/are greater than a specific level. For example, the user may clap their hands together to produce such an impact sound.

Thus, according to an embodiment of the present invention, the voice recognition function may be implemented in two modes. For example, the voice recognition function may be implemented in a first mode for detecting a particular sound or sound effects more than a certain level, and in a second mode for recognizing a voice command and determining a meaning of the voice command. If the sound or sound effects is/are more than a certain level in the first mode, the second mode is activated to thereby to recognize the voice command.

The display screen 440 illustrates still another method of the user activating and deactivating the voice recognition function. In this example, the controller 180 is configured to interpret body movements of the user to start and stop the voice activation function. For example, and as shown in the display screen 440, the controller 180 may be configured to interpret the user moving his hand toward the display as an instruction to activate the voice recognition function, and the user moving his hand away from the display as an instruction to terminate the voice activation function. Short or long-range wireless signals may also be used to start and stop the voice recognition function.

Thus, according to an embodiment of the present invention, because the voice activation function is started and stopped, the voice recognition function is not continuously executed. That is, when the voice recognition function is continuously maintained in the activated state, the amount of resources on the mobile terminal is increased compared to the embodiment of the present invention.

Further, as discussed above with respect to FIG. 5, when the voice recognition function is activated, the controller 180 specifies a domain of a specific database that is used as a reference for voice command recognition into a domain relating to a menu list on the display 151. Then, if a specific menu is selected or executed from the menu list, the domain of the database may be specified into information relating to the selected menu or sub-menus of the specific menu.

Figure 6B:
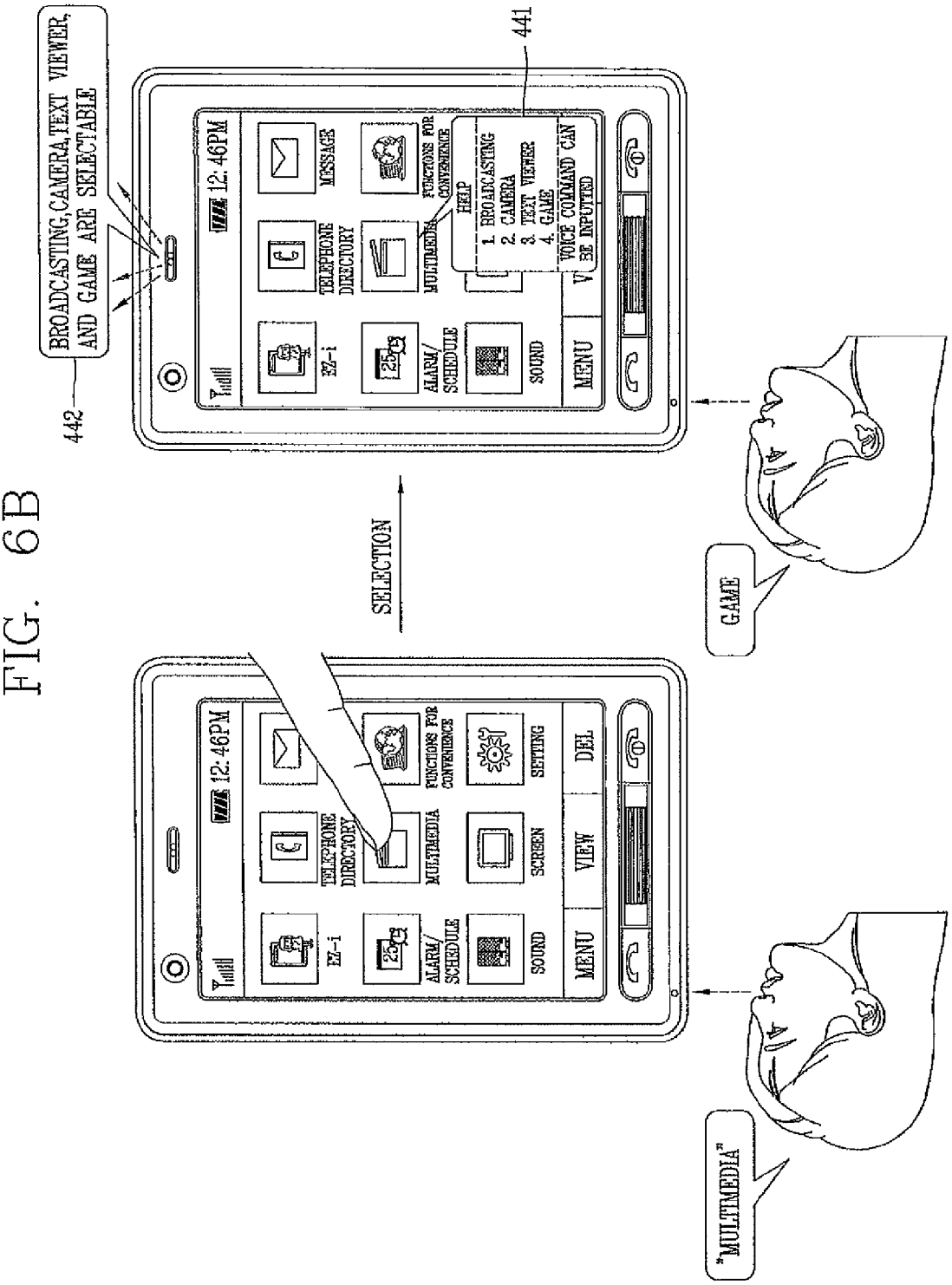

In addition, when the specific menu is selected or executed through a voice command or touch input, the controller 180 may output help information relating to sub-menus of the specific menu in the form of a voice message, or pop-up windows or balloons. For example, as shown in FIG. 6B, when the user selects the 'multimedia menu' via a touching or voice operation, the controller 180 displays information relating to the sub-menus (e.g., broadcasting, camera, text viewer, game, etc.) of the 'multimedia menu' as balloon-shaped help information 441. Alternatively, the controller 180 can output a voice signal 442 including the help information. The user can then select one of the displayed help options using a voice command or by a touching operation FIG. 6C illustrates an embodiment of a user selecting a menu item using his or her body movements (in this example, the user's hand gesture). In more detail, as the user moves his or her finger closer to the menu item 443, the controller 180 displays the sub-menus 444 related to the menu 443. The controller 180 can recognize the user's body movement of information via the sensing unit 140, for example. In addition, the displayed help information can be displayed so as to have a transparency or brightness controlled according to the user's distance. That is, as the user's hand gets closer, the displayed items can be further highlighted.

As discussed above, the controller 180 can be configured to determine the starting and stopping of the voice recognition function based on a variety of different methods. For example, the user can select/manipulate soft or hard buttons, touch an arbitrary position on the touch screen, etc. The controller 180 can also maintain the activation of the voice recognition function for a predetermined amount of time, and then automatically end the activation at the end of the predetermined amount of time. Also, the controller 180 may maintain the activation only while a specific button or touch operation is performed, and then automatically end the activation when the input is released. The controller 180 can also end the activation process when the voice command is no longer input for a certain amount of time.

Next, FIG. 7A is a flowchart showing a method for recognizing a voice command in a mobile terminal according to an embodiment of the present invention. Referring to FIG. 7A, when the voice recognition function is activated, the controller 180 specifies a domain of a database that can be used as a reference for voice command recognition into a domain relating to a menu displayed on the display 151, sub-menus of the menu, or a domain relating to a currently-executed function or menu (S201). The user also inputs the voice command (S202) using either the precise menu name or using a natural language (spoken English, for example).

The controller 180 then stores the input voice command in the memory 160 (S203). Further, when the voice command is input under a specified domain, the controller 180 analyzes a context and content of the voice command based on the specified domain by using a voice recognition algorithm. Also, the voice command may be converted into text-type information for analysis (S204), and then stored in a specific database of the memory 160. However, the step of converting the voice command into text-type information can be omitted.

Then, to analyze the context and content of the voice command, the controller 180 detects a specific word or keyword of the voice command (8205). Based on the detected words or keywords, the controller 180 analyzes the context and content of the voice command and determines or judges a meaning of the voice command by referring to information stored in the specific database (S206).

In addition, as discussed above, the database used as a reference includes a specified domain, and functions or menus corresponding to a meaning of the voice command judged based on the database are executed (S207). For example, if it is assumed that text is input using a STT function after executing the text message writing function, the priorities of such information for the voice command recognition may be set to commands related to modifying text or commands related to searching for another party to receive the text message or transmission of such message. Also, because the database for voice recognition is specified to each information relating to a currently-executed function or menu, the recognition rate and speed for of recognizing the voice command are improved, and the amount of resources used on the terminal is reduced. Further, the recognition rate indicates a matching degree with a name preset to a specific menu.

The recognition rate for an input voice command may also be judged by the number of information relating to specific functions or menus of the voice command. Therefore, the recognition rate for the input voice command is improved when the information precisely matches a specific function or menu (e.g., menu name) that is included in the voice command.

Figure 7B:
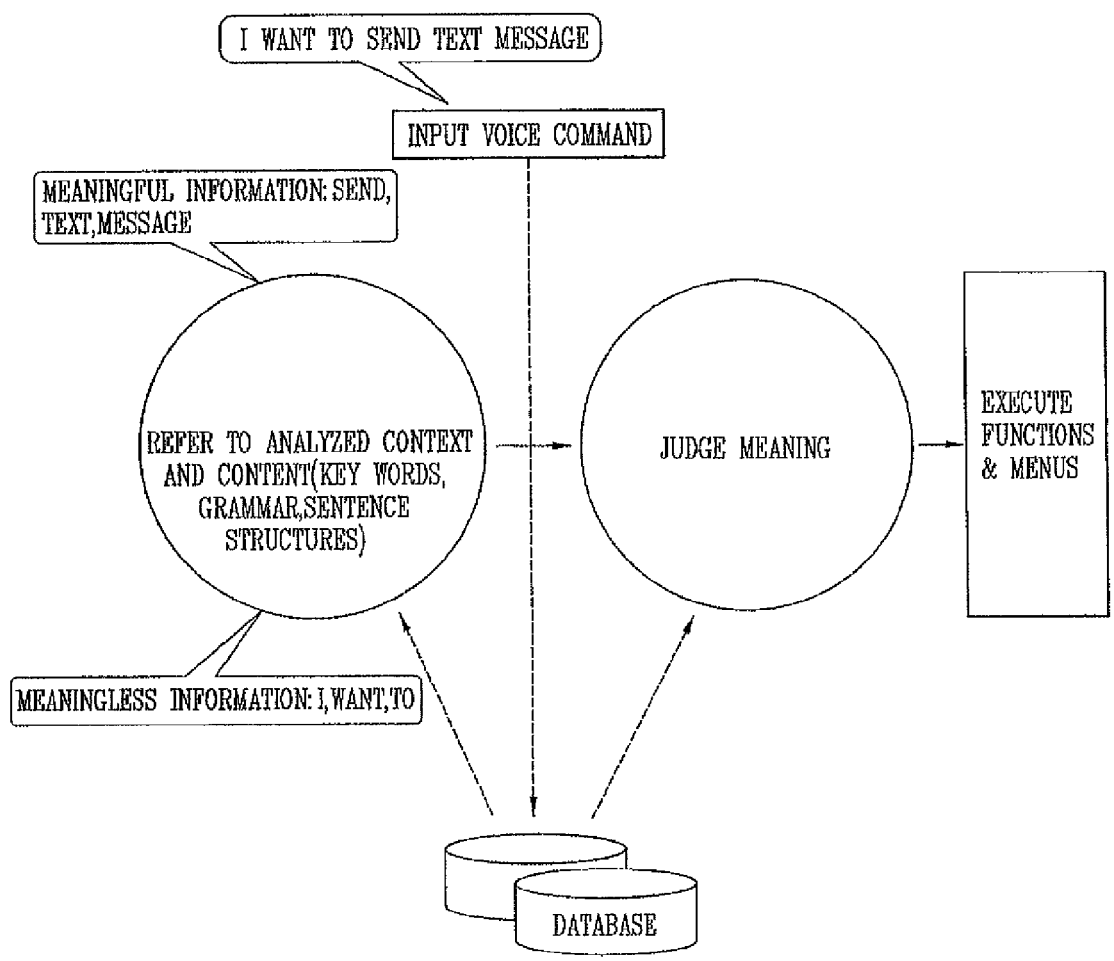
FIG. 7B is an overview illustrating a method for recognizing a voice in a mobile terminal according to an embodiment of the present invention.

In more detail, FIG. 7B is an overview showing a method for recognizing a voice command of a mobile terminal according to an embodiment of the present invention. As shown in FIG. 7B, the user inputs a voice command as a natural language composed of six words "I want to send text messages." In this example, the recognition rate can be judged based on the number of meaningful words (e.g., send, text, messages) relating to a specific menu (e.g., text message). In addition, the controller 180 can determine whether the words included in the voice command are meaningful words relating to a specific function or menu based on the information stored in the database. For instance, meaningless words included in the natural language voice command (e.g., I want to send text messages) that are irrelevant to the specific menu may be the subject (I) or the preposition (to).

Also, the natural language is a language commonly used by people, and has a concept contrary to that of an artificial language. Further, the natural language may be processed by using a natural language processing algorithm. The natural language may or may not include a precise name relating to a specific menu, which sometimes causes a difficulty in completely precisely recognizing a voice command. Therefore, according to an embodiment of the present invention, when a voice command has a recognition rate more than a certain level (e.g., 80%), the controller 180 judges the recognition to be precise.

Further, when the controller 180 judges a plurality of menus to have similar meanings, the controller 180 displays the plurality of menus and the user can select one of the displayed menus to have its functions executed. In addition, a menu having a relatively higher recognition rate may be displayed first or distinctively displayed compared to the other menus.

Figure 8:
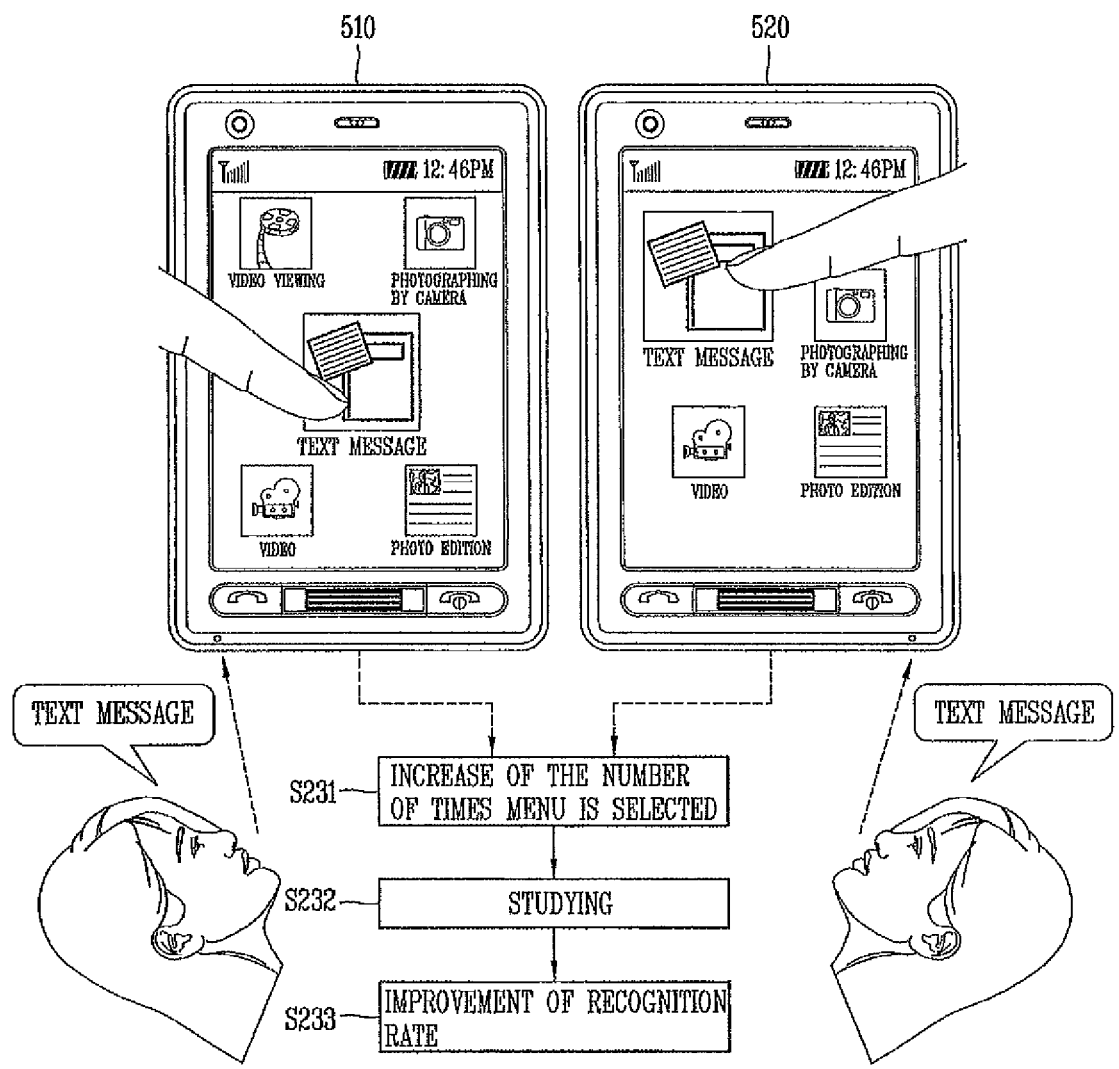
FIG. 8 includes overviews of display screens illustrating a method for displaying a menu in cooperation with a rate of voice recognition in a mobile terminal according to an embodiment of the present invention.

For example, FIG. 8 is an overview showing a method for displaying menus for a voice recognition rate of a mobile terminal according to an embodiment of the present invention. As shown in FIG. 8, a menu icon having a higher recognition rate is displayed at a central portion of the display screen 510, or may be displayed with a larger size or a darker color as shown in the display screen 520. The menu icon having the higher recognition rate can also be displayed first and then followed in order or sequential manner by lower recognition rate menus.

Further, the controller 180 can distinctively display the plurality of menus by changing at least one of the size, position, color, brightness of the menus or by highlighting in the order of a higher recognition rate. The transparency of the menus may also be appropriately changed or controlled.

In addition, as shown in the lower portion of FIG. 8, a menu having a higher selection rate by a user may be updated or set to have a recognition rate. That is, the controller 180 stores a history of the user selections (S231) and performs a learning process (S232) to thereby update a particular recognition rate for a menu option that is selected by a user more than other menu options (S233). Thus, the number of times a frequently used menu is selected by a user may be applied to recognition rate of the menu. Therefore, a voice command input in the same or similar manner in pronunciation or content may have a different recognition rate according to how many times a user selects a particular menu.

Further, the controller 180 may also store time at which the user performs particular functions. For example, a user may check emails or missed messages every time they wake up on Mondays through Fridays. This time information may also be used to improve the recognition rate. The state of the terminal (e.g., standby mode, etc.) may also be used to improve the recognition rate. For example, the user may check emails or missed messages when first turning on their mobile terminal, when the terminal is opened from a closed position, etc.

Figure 9:
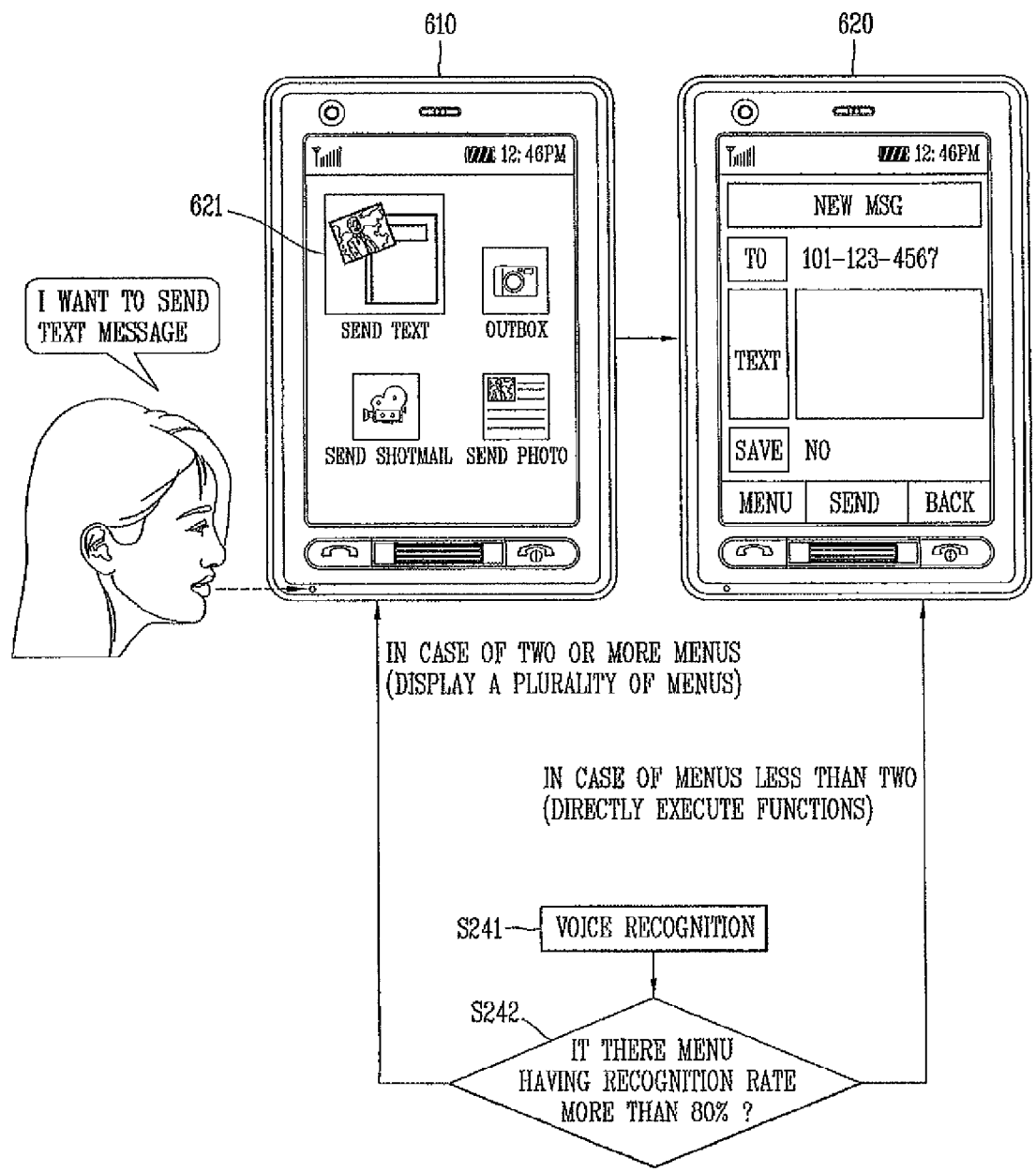
FIG. 9 includes overviews of display screens illustrating a method for recognizing a voice command in a mobile terminal according to an embodiment of the present invention.

Next, FIG. 9 is an overview showing a method for recognizing a voice command of a mobile terminal according to another embodiment of the present invention. As shown in FIG. 9, the user activates the voice recognition function, and inputs the voice command "I want to send text messages." The controller 180 then specifies a domain of a database for voice command recognition into a domain relating to the displayed sub-menus. The controller 180 then interprets the voice command (8241) and in this example, displays a plurality of menus that have a probability greater than a particular value (e.g., 80%) (S242). As shown in the display screen 610 in FIG. 9, the controller displays four multimedia menus.

The controller 180 also distinctively displays a menu having the highest probability (e.g., specific menu option 621 "Send Text" in this example). The user can then select any one of the displayed menus to execute a function corresponding to the selected menu. In the example shown in FIG. 9, the user selects the Send Text menu option 621 and the controller 180 displays sub menus related to the selected Send Text menu option 621 as shown in the display screen 620.

Also, as shown in step (S242) in the lower portion of FIG. 9, the controller 180 can also immediately execute a function when only a single menu is determined to be higher than the predetermined probability rate. That is, the controller 180 displays the information related to the text sending as shown in the display screen 620 immediately without the user having to select the Send Text menu option 621 when the Send Text menu option 621 is determined to be the only menu that has a higher recognition rate or probability than a predetermined threshold.

Further, as discussed above with respect to FIG. 6B, when a specific menu is selected or executed through a voice command or touch input according to an operation state or mode (e.g., a mode for indicating a voice recognition function), the controller 180 can also output balloon-shaped help information related to the sub menus to the user in a voice or text format. In addition, the user can set the operation mode for outputting the help using appropriate menu options provided in environment setting menus. Accordingly, a user can operate the terminal of the present invention without needing or having a high level of skill. That is, many older people may not be experienced in operating the plurality of different menus provided with terminal. However, with the terminal of the present invention, a user who is generally not familiar with the intricacies of the user interfaces provided with the terminal can easily operate the mobile terminal.

In addition, when the controller 180 recognizes the voice command to have a plurality of meanings (i.e., when a natural language voice command (e.g., I want to send text messages) does not include a precise menu name such as when a menu is included in a 'send message' category but does not have a precise name among 'send photo', 'send mail', and 'outbox'), the controller 180 displays a plurality of menus having a recognition rate more than a certain value (e.g. 80%).

Figure 10:
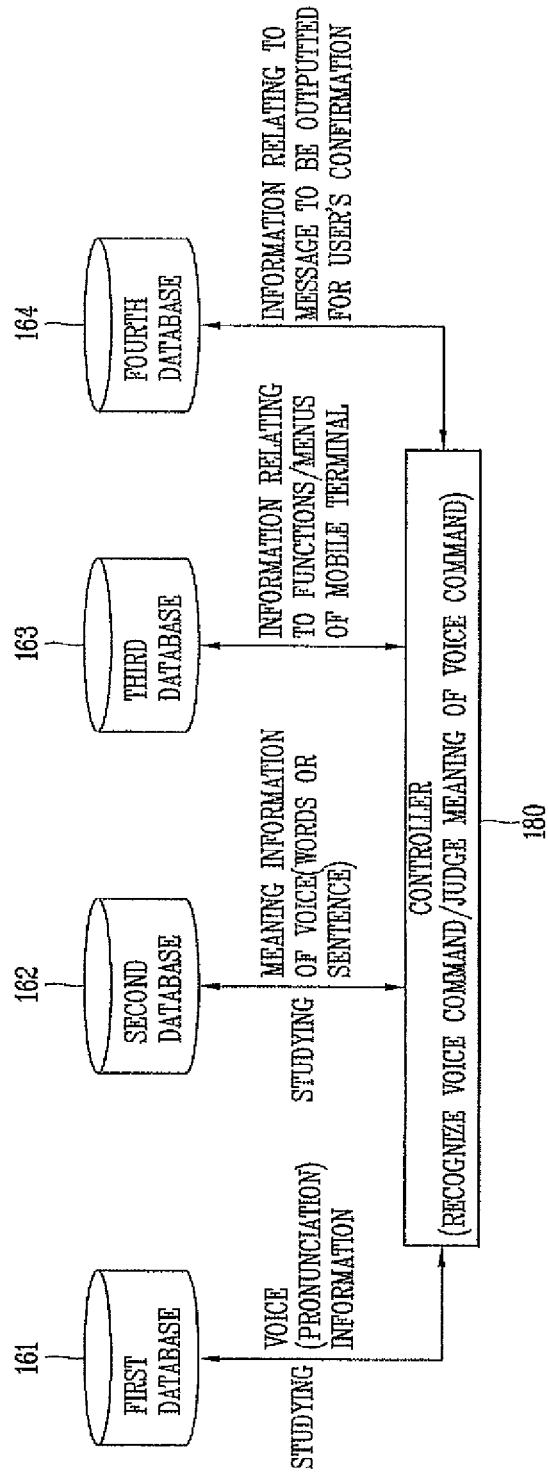
FIG. 10 is an overview illustrating an organization of databases used for recognizing a voice command in a mobile terminal according an embodiment of the present invention.

Next, FIG. 10 is an overview showing a plurality of databases used by the controller 180 for recognizing a voice command of a mobile terminal according to an embodiment of the present invention. In this embodiment, the databases store information that the controller 180 uses to judge a meaning of a voice command, and may be any number of databases according to information features. Further, the respective databases configured according to information features may be updated through a continuous learning process under control of the controller 180.

For example, the learning process attempts to match a user's voice with a corresponding word. For example, when a word "waiting" pronounced by a user is misunderstood as a word "eighteen", the user corrects the word "eighteen" into "waiting". Accordingly, the same pronunciation to be subsequently input by the user is made to be recognized as "waiting".

As shown in FIG. 10, the respective databases according to information features include a first database 161, a second database 162, a third database 163, and a fourth database 164. In this embodiment, the first database 161 stores voice information for recognizing a voice input through the microphone in units of phonemes or syllables, or morphemes. The second database 162 stores information (e.g., grammar, pronunciation precision, sentence structure, etc.) for judging an entire meaning of a voice command based on the recognized voice information. The third database 163 stores information relating to menus for functions or services of the mobile terminal, and the fourth database 164 stores a message or voice information to be output from the mobile terminal so as to receive a user's confirmation about the judged meaning of the voice command.

In addition, the third database 163 may be specified into information relating to menus of a specific category according to a domain preset for voice command recognition. Also, the respective database may store sound (pronunciation) information, and phonemes, syllable, morphemes, words, keywords, or sentences corresponding to the pronunciation information. Accordingly, the controller 180 can determine or judge the meaning of a voice command by using at least one of the plurality of databases 161 to 164, and execute menus relating to functions or services corresponding to the judged meaning of the voice command.

Further, the present invention can display an operation state or mode having the voice command recognition function or STT function applied thereto by using a specific shape of indicator or icon. Then, upon the output of the indicator or icon, the user can be notified through a specific sound or voice.

Figure 11:
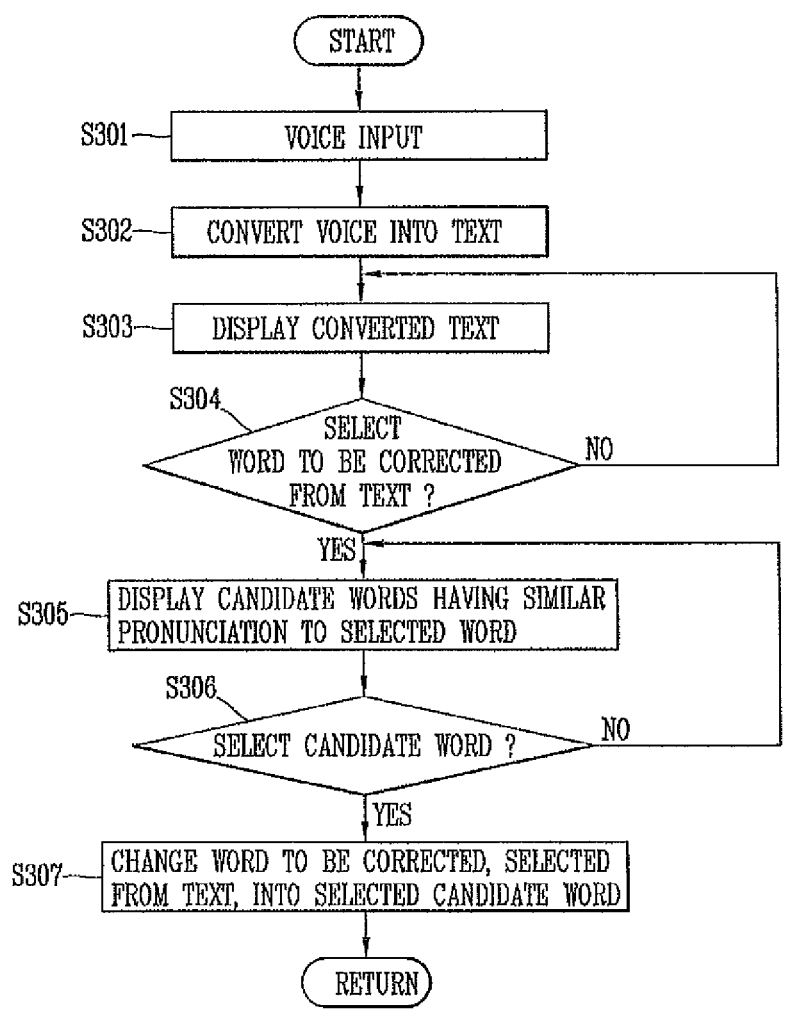
FIG. 11 is a flowchart illustrating a text correcting method in a mobile terminal according to an embodiment of the present invention.

Next, FIG. 11 is a flowchart illustrating a text correcting method for a mobile terminal according to embodiment of the present invention. As shown in FIG. 11, when the user inputs his or her voice (S301), the controller 180 converts the user's voice into text (S302). That is, the controller 180 uses a particular STT algorithm to convert the voice into the text. Then, after converting the voice into text, the controller 180 displays the converted text (S303). Further, the text may be a sentence including a plurality of words.

The controller 180 also determines if there the user has selected a word from the displayed words (S304). That is, the user may see that one of the displayed words in the sentence is incorrect indicating that the controller 180 did not completely recognize the user's voice for a particular word or words. Thus, the user can select the incorrectly interpreted word from the plurality of words displayed on the display 151.

In addition, to select a word on the display 151, the user can use a preset key, touch the word, use a particular finger gesture, apply a specific pressure applied to a certain portion, incline or tilt the terminal, enter an additional voice command, etc. That is, the mobile terminal according to an embodiment of the present invention can be provided with a proximity detecting sensor, a pressure detecting sensor, or a gesture detecting sensor. The following description refers to the user touching the touch screen to select a word, but as discussed above other inputs method also be used.

Further, the controller 180 can distinctively or emphatically display the word selected by the user compared to other words within the text. For instance, the controller 180 can distinctively display the selected word using a different color or brightness, to be bolder or greater than other words, to flicker on and off, by underling or changing the font of the word, etc.

When the controller 180 determines the user has selected a word to be corrected (Yes in S304), the controller 180 displays words (hereinafter, referred to 'candidate words') having a similar pronunciation to the selected word (S305). For instance, if the selected word is 'sea', the candidate words having a similar pronunciation to the word may include 'see', 'set', 'saw' and the like. Further, the candidate words do not have to be preset in a database. Also, according to an embodiment of the present invention, words having more than a certain recognition rate recognized in the voice recognizing step S302 can be sequentially displayed in the order of the highest recognition rate.

Then, when the user selects a candidate word (e.g., 'see') from the displayed candidate words (Yes in S306), the controller 180 changes the incorrectly recognized word (e.g., 'sea') into the selected candidate word (e.g., 'see') and displays the corrected word (S307). Further, the user can select one of the candidate words using any of the selection methods discussed above. The following description refers to the user touching the candidate word to select it. Further, the process of selecting a particular word from the displayed text and changing it to a different candidate word can be repetitively performed.

Next, FIGS. 12A and 12B include overviews of display screens illustrating a method for selecting an arbitrary word so as to correct text displayed on a screen of a mobile terminal according to an embodiment of the present invention.

As shown in FIG. 12A(a), the user inputs the statement "I want to see my pictures." As shown in FIG. 12A(b), the controller 180 converts and displays the voice input by the user into text using a particular STT algorithm stored in the memory 160. Further, as shown in FIG. 12A(c), the controller 180 can emphatically display a particular word that has a voice recognition rate less than a predetermined reference value compared to other words within the text. The controller 180 can also place a cursor on the particular word. In the example shown in FIG. 12A(c), the controller 180 has highlight the word "sea" as it has a recognition rate that is lower than the predetermined reference value.

Also, as shown in FIG. 12B(a), the user can use a navigation key 830 to move a cursor to select a word to correct. The user can also select a particular key (e.g., a hardware key or software key) so as to move the cursor and select a word, or simply touch the word. In addition, as shown in FIG. 12B(b), the user can identify a word to be corrected using a voice command (e.g., "modify sea"). As shown in FIG. 12B(c), the controller 180 emphatically displays the user-selected incorrectly recognized word 820 by increasing the size of the word compared to the other words in the sentence.

Figure 13A:
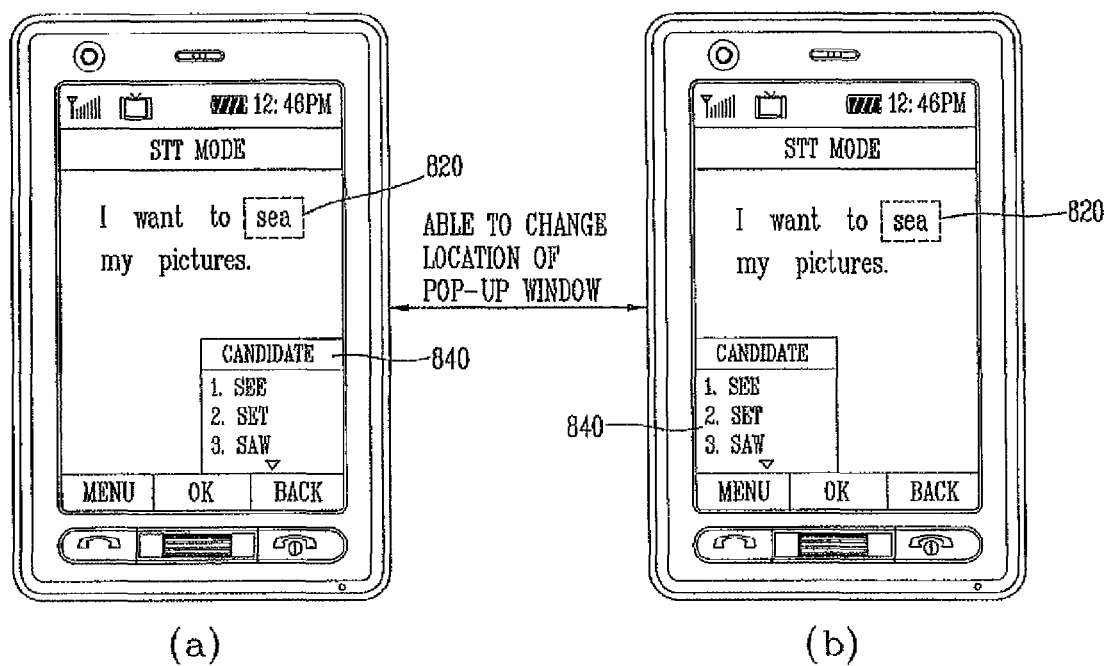
FIGS. 13A and 13B include overviews of display screens illustrating a method for displaying candidate words with respect to a particular selected word from text displayed on a screen of a mobile terminal according to an embodiment of the present invention.
Figure 13B:
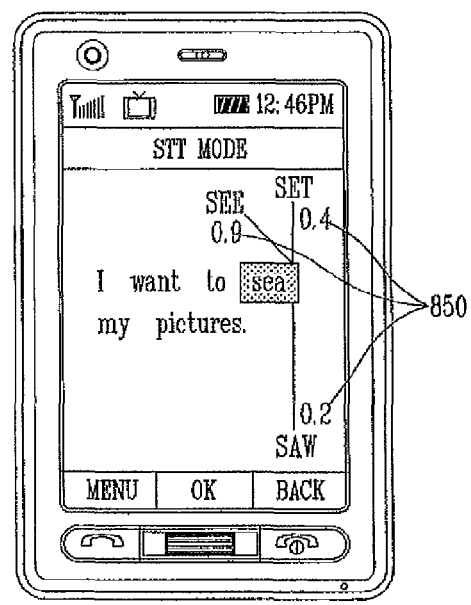

FIGS. 13A and 13B include overviews of display screens illustrating a method for displaying candidate words with respect to a particular word selected by a user from text displayed on a screen of a mobile terminal according to an embodiment of the present invention. As shown in FIG. 13A (a), the controller 180 displays a window 840 including candidate words in a candidate word list with respect to the selected word 820 to be corrected.

In more detail, when the user selects the word 'sea', the controller 180 displays the window 840 including the candidate word list (e.g., see, set, saw and the like) having a similar pronunciation to the selected word. Further, the candidate words in the candidate word list displayed on the pop-up window 840 are preferably displayed in the order of having a higher probability (i.e., a probability to be a correctly voice-recognized word or a voice recognition rate). FIG. 13B(b) illustrates the controller 180 displaying the window 840 at another location on the display screen.

Also, as shown in FIG. 13B, the controller 180 can display candidate words based upon the selected word (e.g., 'sea') with respective certain intervals from the selected word, That is, the candidate words are displayed as being spaced apart from the selected word according to their probabilities. In more detail, and as shown in FIG. 13B, the words SET, SEE, and SAW include the probabilities 850. As shown, the word "SEE" has the highest probability of 0.9 and is displayed as being closest to the selected word "sea." Further, the candidate word "SAW" has the lowest probability of 0.2 and is disposed farthest from the selected word "sea."

Further, the controller 180 can display the candidate words such that all candidate words are displayed or can only display a predetermined number of candidate words. Alternatively, the controller 180 can display only candidate words as the user touches and slides their finger along the sliding bar shown in FIG. 13B. Thus, when the user touches a particular portion of the bar shown in FIG. 13B, the controller 180 displays a candidate word (or words) corresponding to the touched position. Therefore, the user can slide their finger up and down the slide bar to see the different candidate words.

In addition, rather than displaying the slide bar in FIG. 13B, the controller 180 can display a tree diagram with the selected word being positioned with respect to a first position on the tree diagram and the plurality of candidate words being positioned at different positions on the tree diagram based on how similar the corresponding candidate word is to the selected word.

Further, the probability of each candidate word can be determined grammatically or determined by studying. Also, the probability of each candidate can be automatically changed and updated via a studying or repetitive process or be manually changed by a user. That is, after selecting a specific candidate word, the user can drag the selected candidate word close to the selected word or move the location of the selected candidate word, and therefore change the recognition rate of the selected candidate word according to the location movement thereof.

Figure 14A:
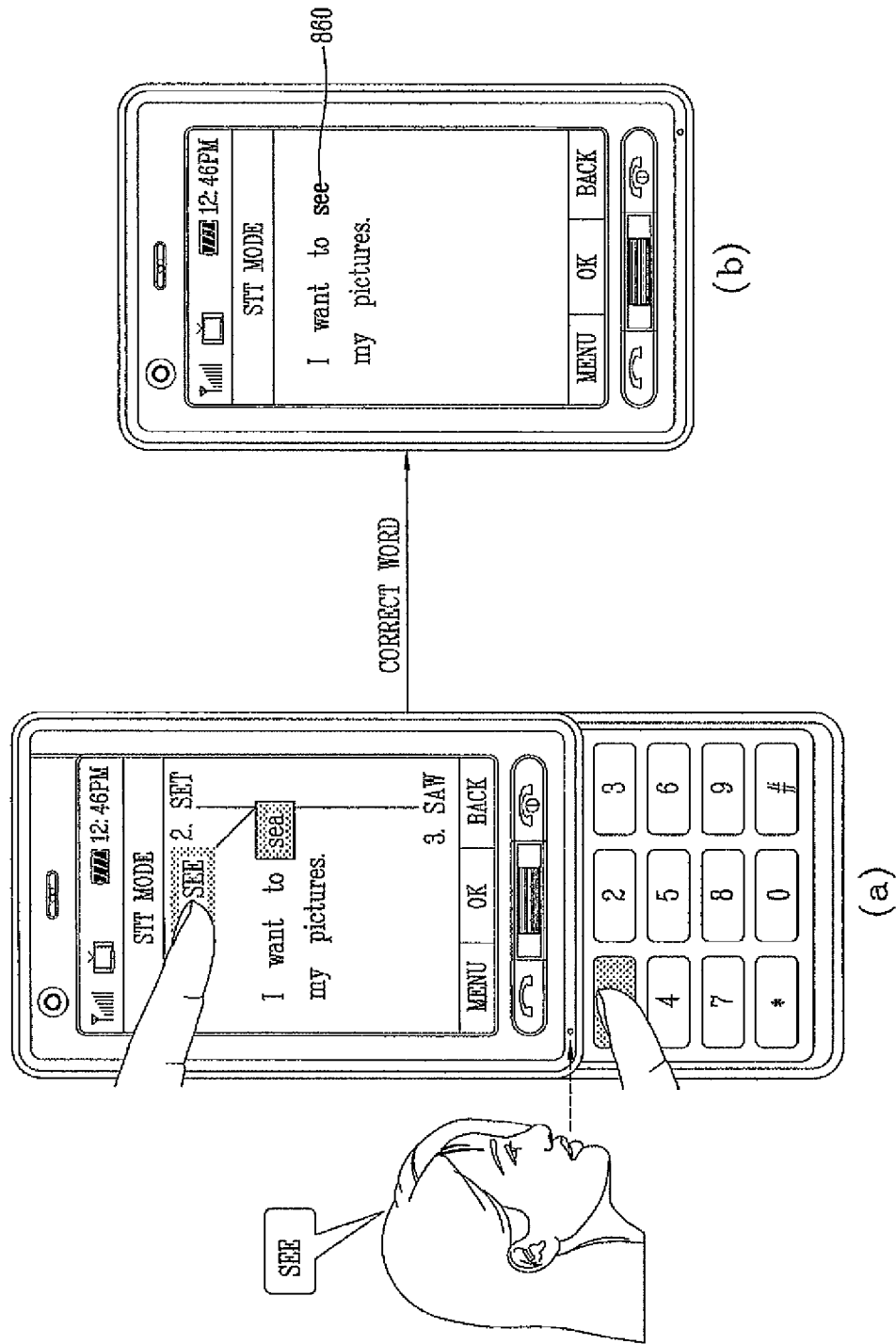

In addition, the controller 180 may also display the recognition rate of each candidate word as shown in FIG. 13B. The controller 180 can also radially display each candidate word so the candidate words do not overlap with each other. Next, as shown in FIG. 14A(a), the user can select a particular candidate word by touching the candidate word or by speaking the candidate word. Then, as shown in FIG. 14A(b), when the user selects the candidate word, the controller 180 changes the incorrectly identified word into the selected candidate word.

Further, after the user selects the specific candidate word from the candidate word list, the controller 180 preferably releases the candidate word list. The controller 180 can also emphatically displayed the selected candidate word that has been added to the sentence as shown in FIG. 14A(b).

In addition, FIG. 14B illustrates an alternative embodiment of the user selecting and correcting a displayed word. In more detail, as shown in FIG. 14B(a), the user can select a word that has been incorrectly converted by touching the word. As shown in FIG. 14B(b), the controller 180 emphatically displays the selected word 820. The user can then correct the word 820 by speaking the correct word into the terminal (e.g., "see"). The controller 180 then displays the corrected word 860 as shown in FIG. 14B(c). The process of correcting a misinterpreted spoke word can be repeated as necessary to correct multiple words in a sentence.

Figure 15:
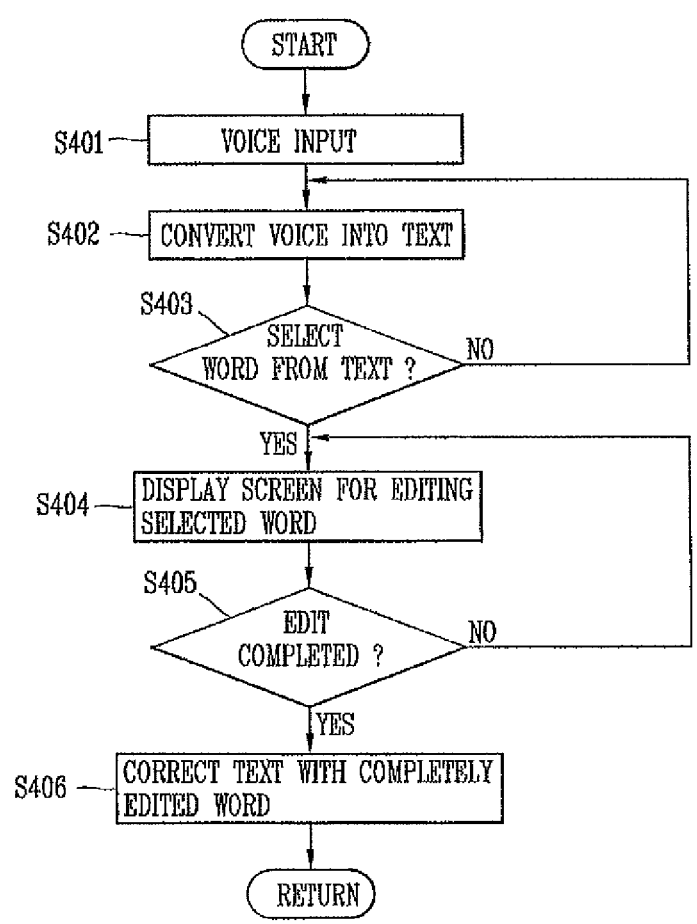
FIG. 15 is a flowchart illustrating a text correcting method in a mobile terminal according to another embodiment of the present invention.

FIG. 15 is a flowchart illustrating a text correcting method in a mobile terminal according to an embodiment of the present invention. In this embodiment, characters of a selected word are edited and corrected. In more detail, the user first inputs information into the terminal using their voice (S401). The controller 180 then converts the input voice information into text (S402).

Further, the text may include one or more sentences. The user can also visually check whether the displayed text contains misrecognized word(s) (i.e., a word to be corrected). The user can then select a word that he or she wants to correct (Yes in S403), and the controller 180 displays a screen for editing the selected word (S404). Again, the user can select the word using a touch input method, etc. as described above.

The controller 180 then determines if the user has finished correcting the selected word (Yes in S405), and corrects the misspelled or misinterpreted word with the user-edited word (S406). For example, the user can select a word and then input a voice command (e.g., Modify) which has been preset for editing characters of the selected word. Alternatively, the voice command can be "Modify sea" in which the controller 180 both selects the word "Sea" and provides an editing screen so the user can edit the selected word.

In still another embodiment, the controller 180 can select a particular word based on the user moving his or her finger or a stylus pen towards a particular word included in the displayed text. That is, the controller 180 can select a particular word when the user moves his or her finger toward the particular word without actually touching the word (e.g., based on a proximity touch). The controller 180 can also emphasize the selected word compared to other words within the text according to a proximity of the user's finger or stylus pen, for example. A pressure selection method including a slightly touching operation may also be used.

As such, the mobile terminal according to embodiments of the present invention distinguishes between a user's preliminary operation for selecting a word (e.g., a word approaching operation, or a slight touch operation applying a pressure less than a reference value) and a decision operation (e.g., an operation of touching a word or a touch operation applying a pressure more than a reference value).

Further, to edit the selected word, the controller 180 can automatically display an editing screen or only display the editing screen based on a manual operation input by the user. These different operations can be set according to a preset environment setup option.

Figure 16A:
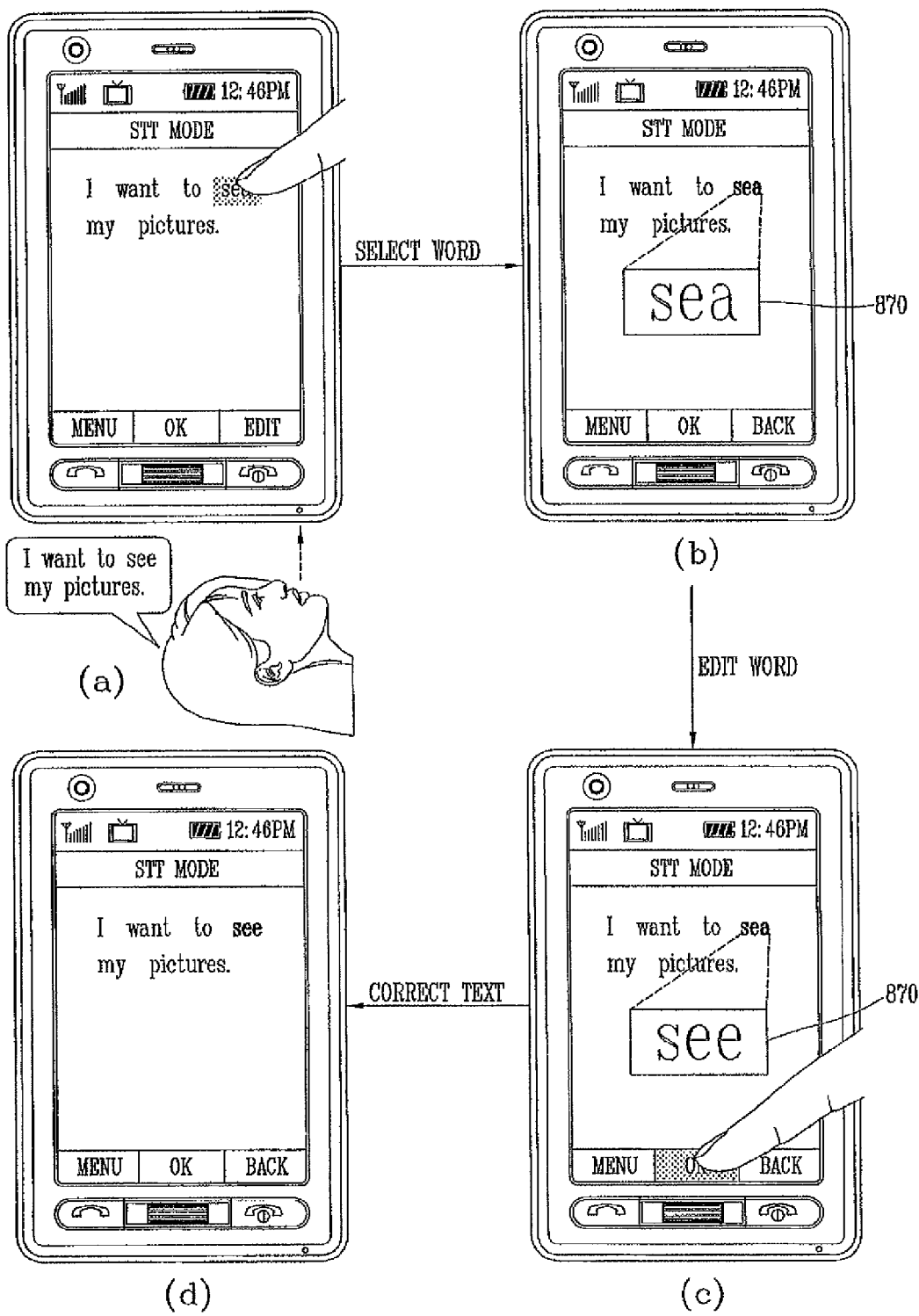

Next, FIGS. 16A and 16B include overviews of display screens illustrating a method for editing a specific word displayed on a mobile terminal according to an embodiment of the present invention. In more detail, as shown in FIG. 16A(a), the user inputs a voice instruction "I want to see my pictures." The controller 180 then converts the input voice instruction and displays the converted text on the display screen. In addition, the controller 180 can automatically emphatically display one or more particular words that have a voice recognition rate lower than a reference value (or a word having a high probability to be corrected). The user can refer to the displayed information in the emphasized state, and select the emphasized word or any other word displayed on the display screen.

In FIG. 16A(b), the controller 180 emphatically displays the selected word 870 compared to the other words. For example, the selected word can be enlarged or can be displayed using a different color or brightness, to be bolder, to flicker, to be underlined, etc. The controller 180 can also select a particular word based on the user moves his or her finger, a stylus, etc. toward the selected word, based on the user pressing the word more than a preset reference value, etc.

In addition, as shown in FIGS. 16A(b) and 16A(c), when the user selects the word, the controller 180 provides an editing screen 870 in which the user can edit individual characters within the selected word. The controller 180 can also adjust a transparency of the editing screen 870 such that the screen 870 can be displayed over the text. Then, after the user has edited the selected word in the screen 870 (e.g., using a keyboard feature), the controller 180 updates the corrected word as shown in FIG. 16A(d). Further, the controller 180 can determine the user has finished editing the selected word in a variety of ways. For example, the user can press an Enter key, touch an OK soft button, perform a particular moving or hand gesture, etc.

Next, FIG. 16B includes overviews of display screens illustrating another method for editing the word selected in FIG. 16A. In more detail, as shown in FIG. 16B(a), the user has selected the word "sea" that is to be corrected. The controller 180 then displays a candidate word list 841 including words that can be selected as shown in FIG. 16B(a). In the example shown in FIG. 16B(a), the words included in the candidate word list 841 do not include the word "see" desired by the user.

Thus, in this instance, the user can select the edit soft key 831 (or another hard key) so as to directly edit the selected word. When the user selects the predetermined key 831 to thereby edit the selected word, the controller 180 displays the editing window 870 that the user can use to edit individual characters of the selected word as shown in FIG. 16B(b). The controller 180 also displays a software keypad 832 that the user can use for editing the selected word. Further, the controller 180 can automatically display the appropriate keypad 832 according to the type of language (e.g., Korean, English, numbers, specific characters or the like). Thus, as shown in FIG. 16B(b), the user can edit the selected word using the software keypad 832 displayed on the display 151. Alternatively, as shown in FIG. 16B(c), the user can edit the selected word using the keys provided on the second user input unit 215. Then, after the user finishes editing the selected word, the controller 180 updates the selected word to be the newly edited word as shown in FIG. 16B(d).

The edit window 870 in FIGS. 16A and 16B can also be a new window such that the displayed converted text (e.g., "I want to see my pictures") is covered and can not be seen. Alternatively, the edit window 870 can be transparent, partially overlaid on top of the other displayed text, etc.

Figure 17A:
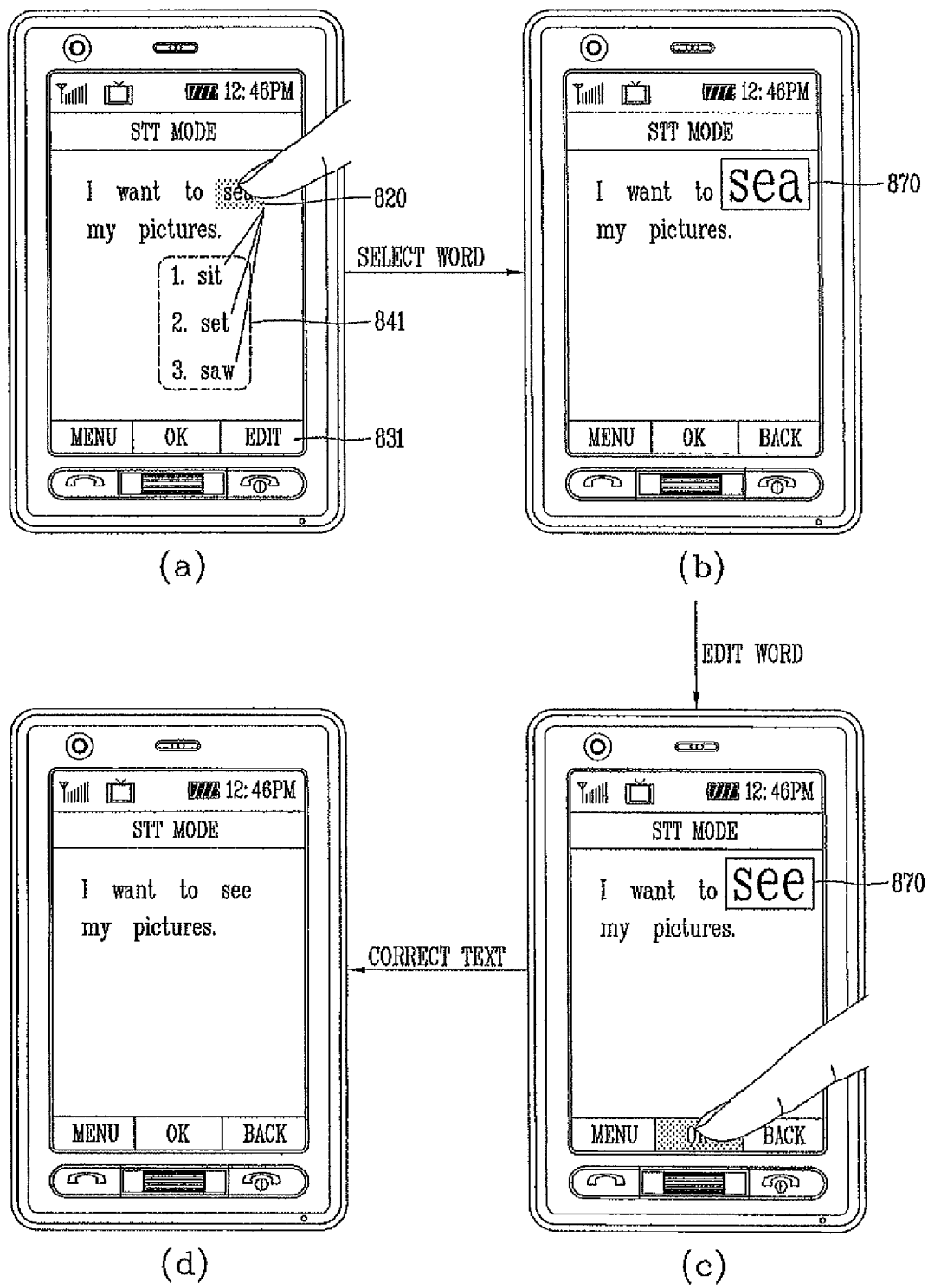

Next, FIGS. 17A and 17B include overviews of display screens illustrating a method for editing a specific word displayed on a mobile terminal according to another embodiment of the present invention. As shown in FIG. 17A(a), the controller 180 has converted voice input by the user into text, and has emphatically displayed the word 820 having a voice recognition rate less than a preset reference value (or a word having a high probability to be corrected).

The user then selects the word 820 to be corrected (the user can also select any other displayed word). When the user selects the word 820, the controller 180 displays a candidate word list 841 including a plurality of candidate words. In the example shown in FIG. 17A(a), the candidate word list 841 does not include a word the user wants to select. Therefore, the user requests the controller 180 display the editing screen 870 as shown in FIG. 17A(b).

The user can request the editing screen 870 using a variety of input methods including an additional voice command, a particular key manipulation, touch, pressure, approach, etc. The user can also double touch the selected word or touch and hold the selected word for a predetermined amount of time.

Then, as shown in FIG. 17A(c), the user manually corrects the selected word in the editing screen 870. After the user corrects the selected word, the controller 180 updates the correct word as shown in FIG. 17A(d).

FIG. 17B includes overviews of display screens illustrating an alternative method for editing the selected word in FIG. 17A. As shown in FIG. 17B(a), the controller 180 displays the candidate word list 841 when the user selects the word 820. However, similar to the embodiment shown in FIG. 17A, the candidate word list 841 does not include the word the user wants to select.

Thus, in this instance, the user selects the preset Edit key 831 to instruct the controller 180 to display the edit screen 870 such that the user can manually edit the selected word as shown in FIG. 17B(b). Further, FIG. 17B(b) illustrates the controller 180 displaying the soft keypad 832 and FIG. 17B(c) illustrates the user using the manual keypad 215 to edit the selected word. This is similar to the embodiment shown in FIGS. 16B(b) and 16B(c). Then, as shown in FIG. 17B(d), the controller 180 corrects the selected word 870.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180). That is, the embodiments of the present invention can be implemented in a medium having a program recorded as computer-readable codes. The computer-readable medium may include all types of recording apparatuses each storing data which is readable by a computer system. Examples of such computer-readable media may include ROM, RAM, CD-ROM, magnetic tape, floppy disk, optical data storage element and the like.

In addition, the mobile terminal 100 may be implemented in a variety of different configurations. Examples of such configurations include a folder-type, slide-type, bar-type, rotational-type, swing-type and combinations thereof.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a voice receiving unit;

a display unit;
an input unit; and
a controller configured to:
convert the voice input received via the voice receiving unit into text;
control the display unit to display the text in which a word of the text is emphatically displayed if a voice recognition rate of the word is less than a preset reference value;
receive a first touch selection signal indicating an emphasized word is touch selected for correction;
control the display unit to display a plurality of candidate words to replace the selected word;
receive a second touch signal indicating a candidate word is selected from the plurality of candidate words; and
replace the selected word with the candidate word and stop displaying the plurality of candidate words when the second touch signal is received,
wherein the controller is further configured to:
simultaneously display the converted text in a first direction and display the plurality of candidate words in a list in a second direction perpendicular to the first direction;
display a slide bar with the selected word being positioned with respect to a first position on the slide bar;
receive a touch and slide action on the slide bar; and
display candidate words at different positions on the slide bar based on the touch and slide action, and
wherein as the touch and slide action slides away from the position of the selected word, candidate words having a lower similarity to the selected word are displayed, and as the touch and slide action slides toward the position of the selected word, candidate words having a higher similarity to the selected words are displayed.

2. The mobile terminal of claim 1, wherein the display unit is further configured to display a corresponding candidate word that has a highest similarity to the selected word closest to the selected word, and to display a corresponding candidate word that has a lowest similarity to the selected word farthest from the selected word.

3. The mobile terminal of claim 1, wherein the controller is further configured to display a tree diagram with the selected word being positioned with respect to a first position on the tree diagram and the plurality of candidate words being positioned at different positions on the tree diagram based on how similar each candidate word is to the selected word.

4. The mobile terminal of claim 1, wherein the controller is further configured to update a voice recognition algorithm used to convert the voice input to the text based on the selected candidate word.

5. The mobile terminal of claim 1, wherein the controller is further configured to display a probability value next to each of the plurality of candidate words indicating how similar the plurality of candidate words are to the selected word.

6. The mobile terminal of claim 1, wherein the controller is further configured to control the display unit to display a keyboard allowing an editing of the emphasized word when the emphasized word is selected.

7. The mobile terminal of claim 1, wherein the controller is further configured to control the display unit to discriminately display the selected words from other words displayed on the display.

8. The mobile terminal of claim 1, wherein the word of the text is emphasized by underlining the word.

9. A method of controlling a mobile terminal, the method comprising:
converting voice input received via a voice receiving unit into text;
displaying, via a display unit, the text in which a word of the text is emphatically displayed if a voice recognition rate of the word is less than a preset reference value;
receiving, via a controller, a first touch selection signal indicating an emphasized word is touch selected for correction;
displaying, via the display unit, a plurality of candidate words to replace the selected word;
receiving, via the controller, a second touch signal indicating a candidate word is selected from the plurality of candidate words;
replacing, via the controller, the selected word with the candidate word and stop displaying the plurality of candidate words when the second touch signal is received;
displaying a slide bar with the selected word being positioned with respect to a first position on the slide bar;
receiving a touch and slide action on the slide bar; and
displaying candidate words at different positions on the slide bar based on the touch and slide action,
wherein as the touch and slide action slides away from the position of the selected word, candidate words having a lower similarity to the selected word are displayed, and as the touch and slide action slides toward the position of the selected word, candidate words having a higher similarity to the selected words are displayed, and
wherein the converted text is displayed in a first direction and the plurality of candidate words are simultaneously displayed in a list in a second direction perpendicular to the first direction.

10. The method of claim 9, wherein the displaying the plurality of candidate words comprises displaying a corresponding candidate word that has a highest similarity to the selected word closest to the selected word, and displays a corresponding candidate word that has a lowest similarity to the selected word farthest from the selected word.

11. The method of claim 9, wherein the displaying the plurality of candidate words further comprises displaying a tree diagram with the selected word being positioned with respect to a first position on the tree diagram and the plurality of candidate words being positioned at different positions on the tree diagram based on how similar each candidate word is to the selected word.

12. The method of claim 9, further comprising:
updating a voice recognition algorithm used to convert the received voice input to the text based on the selected candidate word.

13. The method of claim 9, wherein the displaying the plurality of candidate words further comprises displaying a probability value next to each of the plurality of candidate words indicating how similar the plurality of candidate words are to the selected word.

14. The method of claim 9, wherein the displaying the plurality of candidate words further comprises displaying a keyboard allowing an editing of the emphasized word when the emphasized word is selected.

15. The method of claim 9, wherein the displaying the plurality of candidate words further comprises discriminately displaying the selected word from other words displayed on the display.

16. The method of claim 9, wherein the word of the text is emphasized by underlining the word.

* * * * *